US006734940B2

(12) United States Patent
Hirabayashi

(10) Patent No.: US 6,734,940 B2
(45) Date of Patent: May 11, 2004

(54) SEMICONDUCTOR DEVICE, ELECTRO-OPTICAL DEVICE SUBSTRATE, LIQUID CRYSTAL DEVICE SUBSTRATE AND MANUFACTURING METHOD THEREFOR, LIQUID CRYSTAL DEVICE, AND PROJECTION LIQUID CRYSTAL DISPLAY DEVICE AND ELECTRONIC APPARATUS USING THE LIQUID CRYSTAL DEVICE

(75) Inventor: Yukiya Hirabayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 542 days.

(21) Appl. No.: 09/776,678

(22) Filed: Feb. 6, 2001

(65) Prior Publication Data

US 2001/0028415 A1 Oct. 11, 2001

(30) Foreign Application Priority Data

Mar. 13, 2000 (JP) ......................................... 2000-069399

(51) Int. Cl.⁷ .................. G02F 1/1333; G02F 1/136; G02F 1/1345; G02F 1/13
(52) U.S. Cl. ................. 349/149; 349/40; 349/46; 349/187; 430/30; 348/128
(58) Field of Search .................. 349/40, 46, 149, 349/187; 348/128; 430/30

(56) References Cited

U.S. PATENT DOCUMENTS

| 6,005,647 A | * | 12/1999 | Lim | 349/40 |
| 6,084,648 A | * | 7/2000 | Yeo | 349/40 |
| 6,128,051 A | * | 10/2000 | Kim et al. | 349/40 |

FOREIGN PATENT DOCUMENTS

| JP | 9-283620 | 10/1997 |
| JP | A-11-95257 | 4/1999 |
| JP | 2000-031416 | 1/2000 |

\* cited by examiner

Primary Examiner—Julie-Huyen L. Ngo
(74) Attorney, Agent, or Firm—Oliff & Berridge, PLC

(57) ABSTRACT

Methods and systems are provided for securely preventing cracking or peeling of an insulating film in the periphery of a cutting portion of cutting short-circuit wiring by etching in a substrate, such as a liquid crystal device substrate that includes short-circuit wiring for a measure against static electricity. In particular, in the liquid crystal device substrate, cutting holes are provided by etching in a first interlayer insulating film and a second interlayer insulating film, which cover short-circuit wiring provided as electrostatic measure wiring, for cutting the short-circuit wiring. An etching stop layer made of a single crystal silicon film having resistance to etching of the second interlayer insulating film is formed in a wider range than the cutting holes between the short-circuit wiring and the buried oxide film.

18 Claims, 30 Drawing Sheets

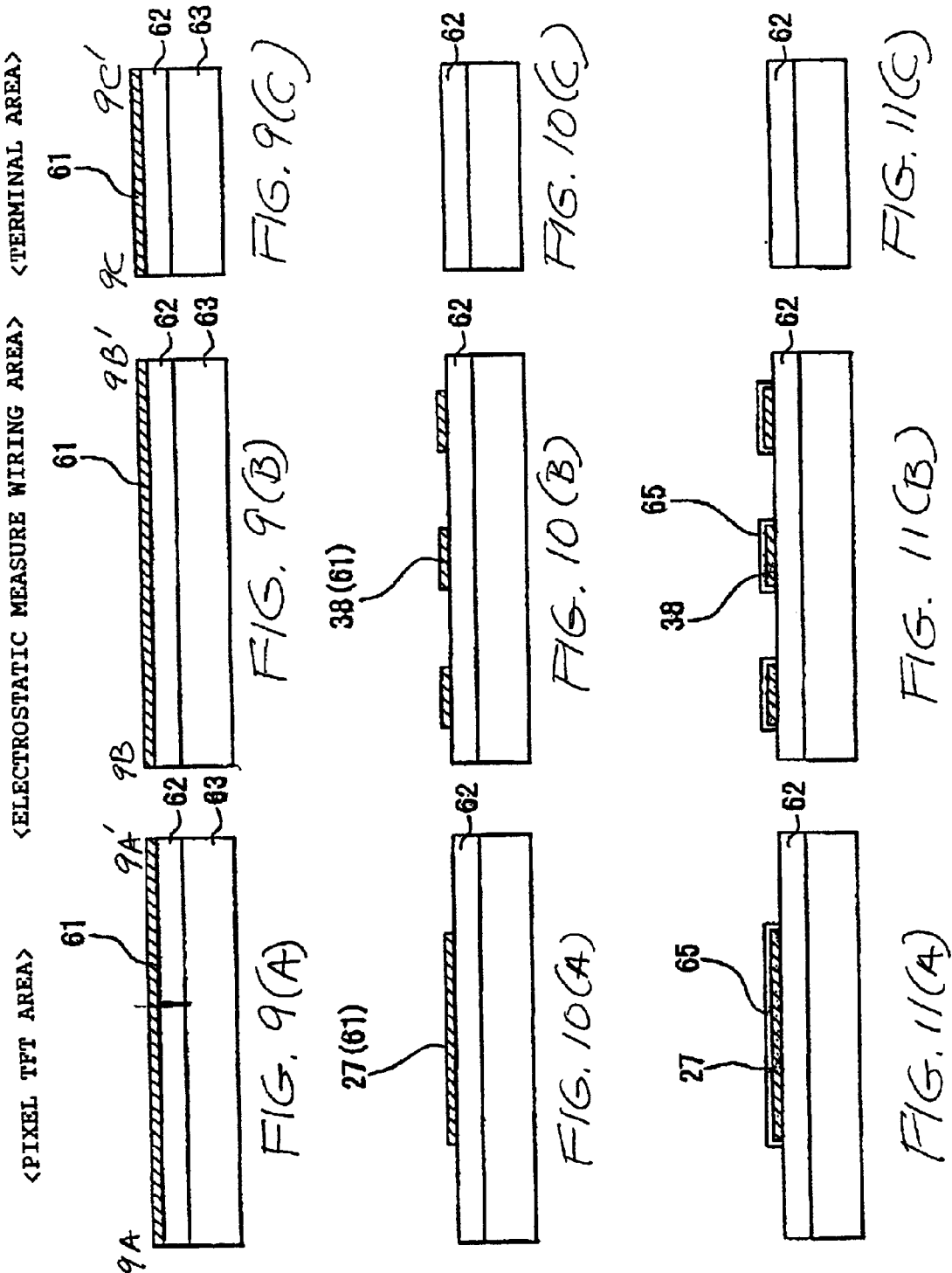

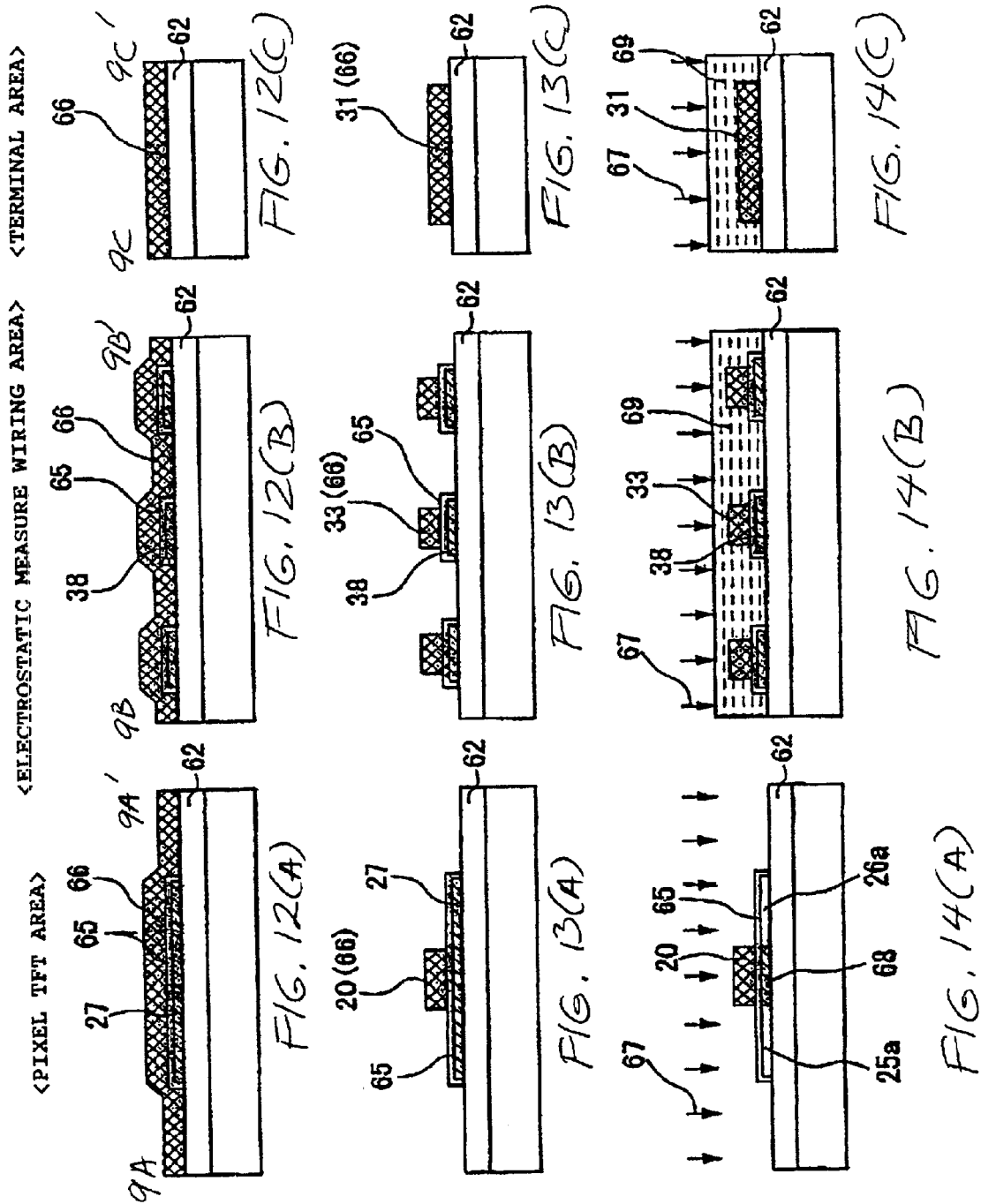

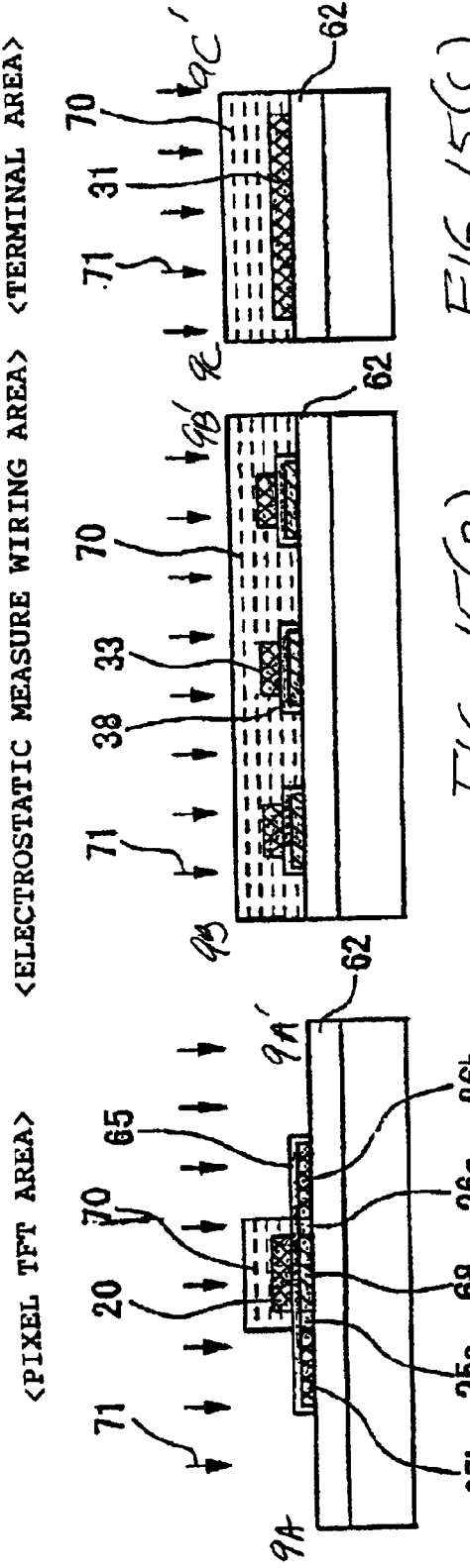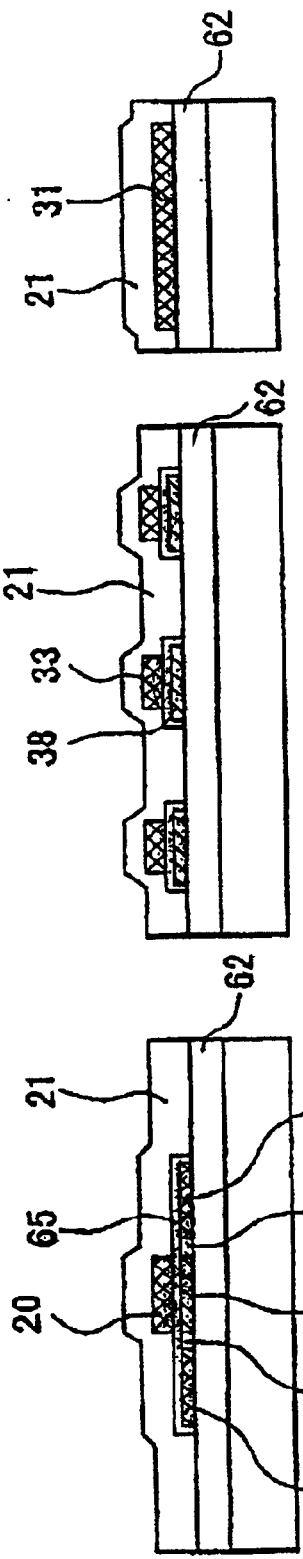

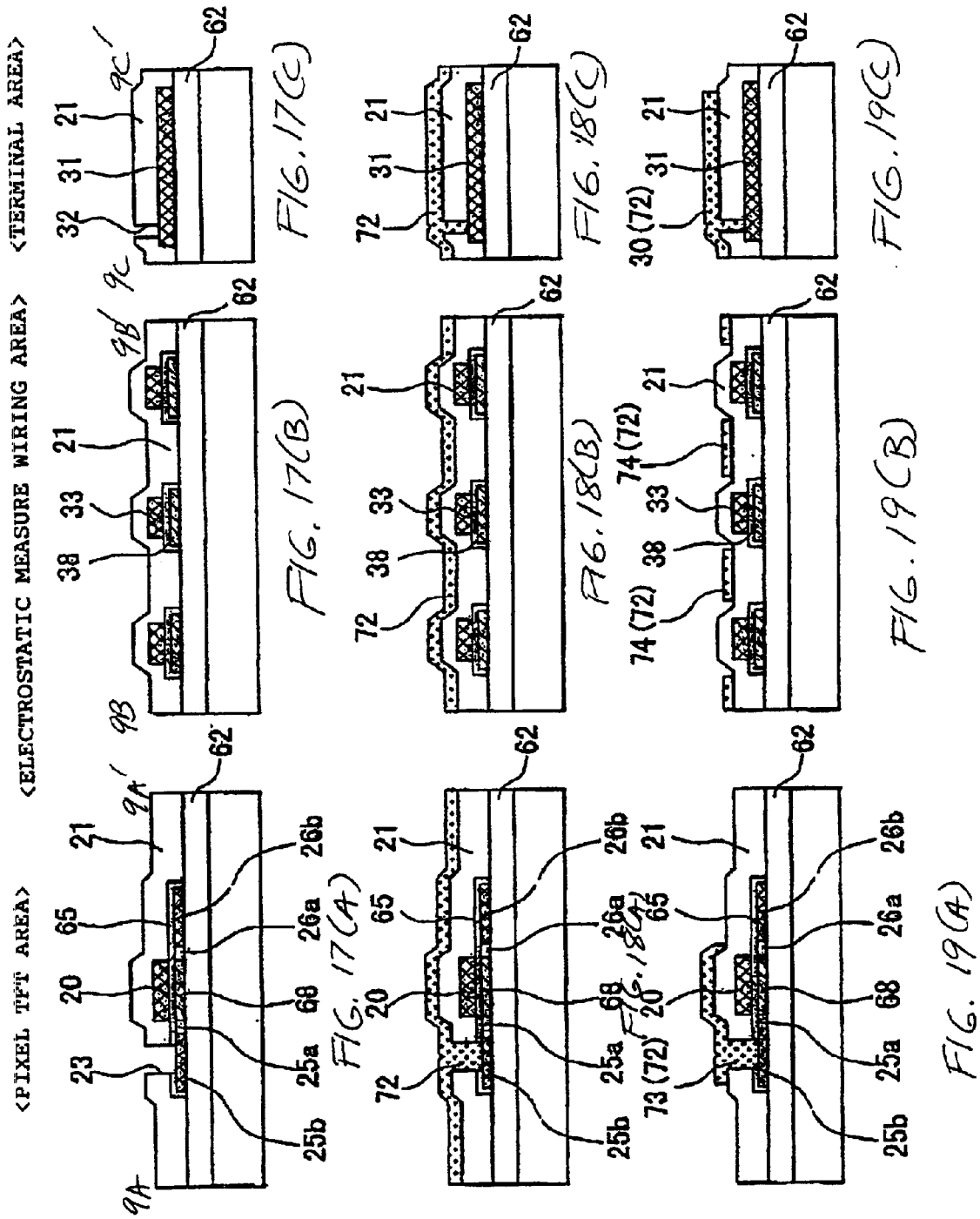

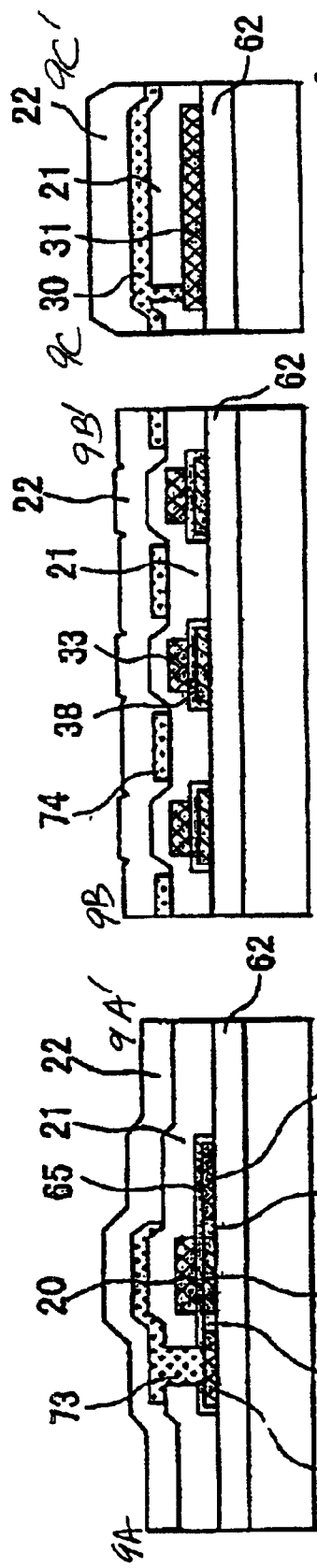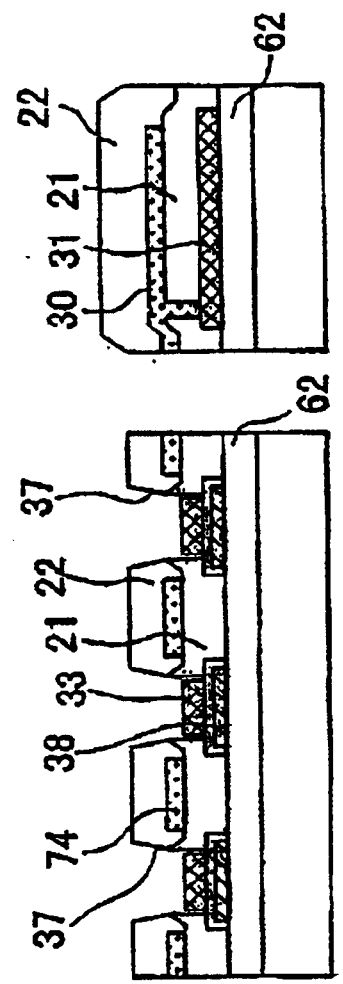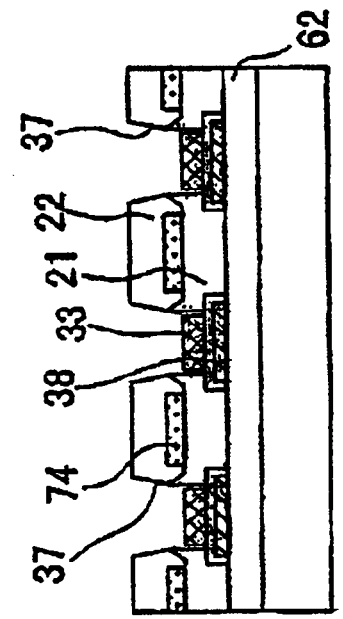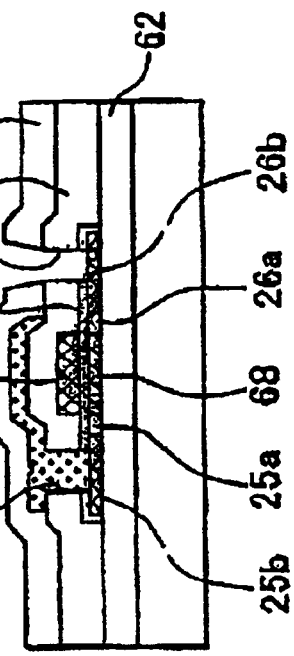

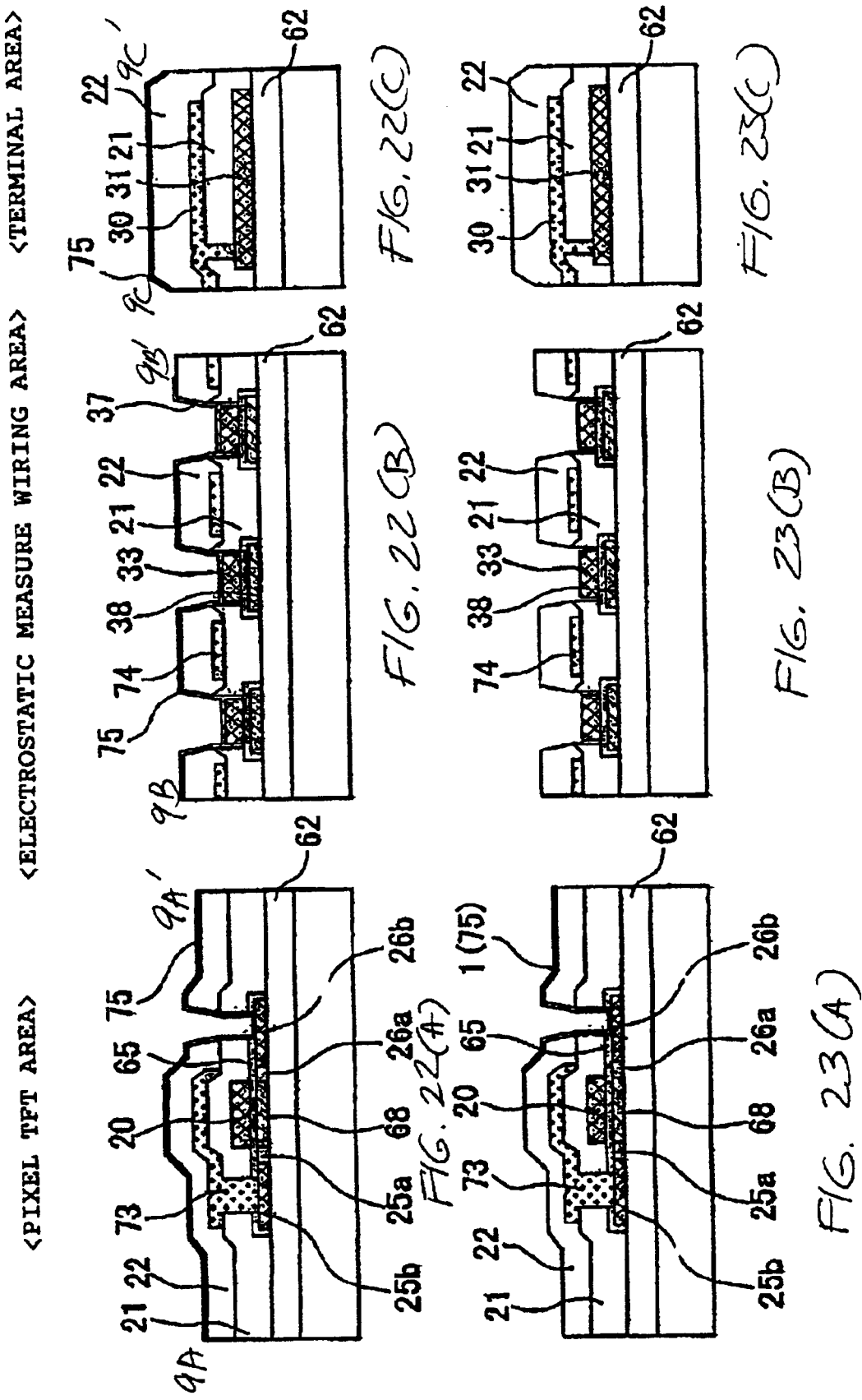

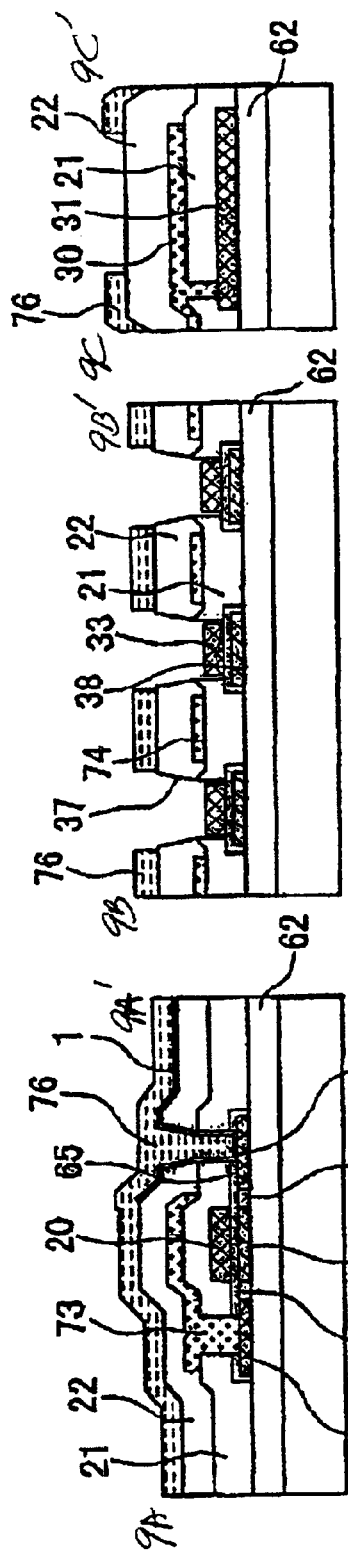
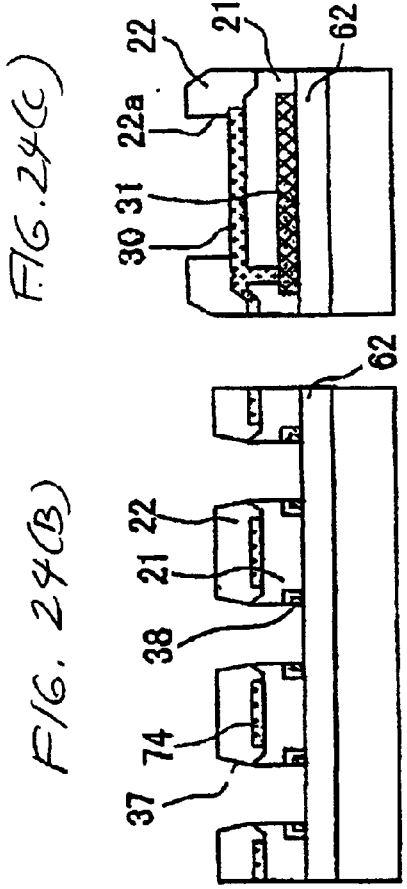
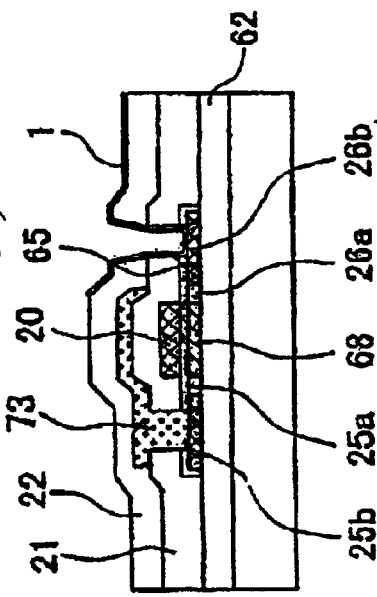

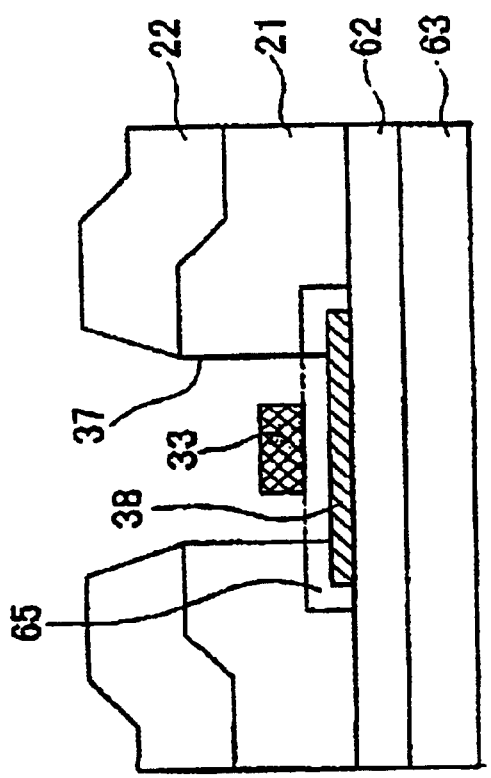
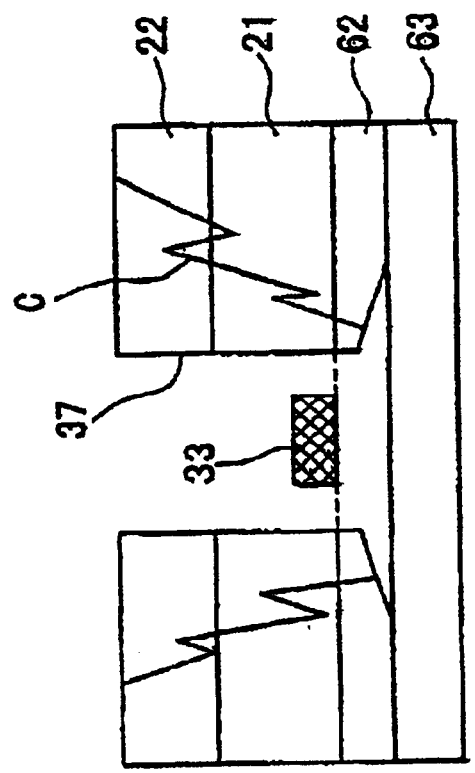

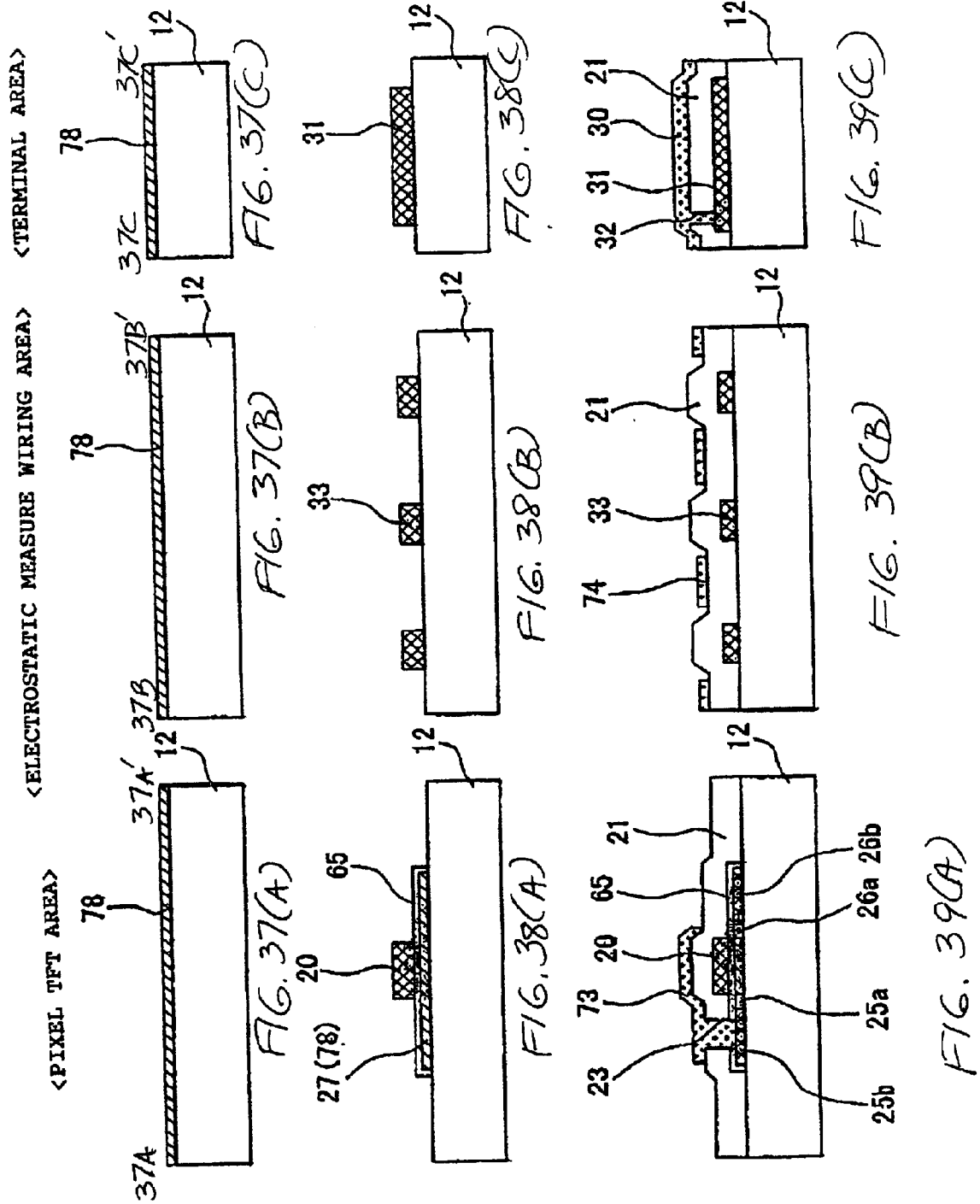

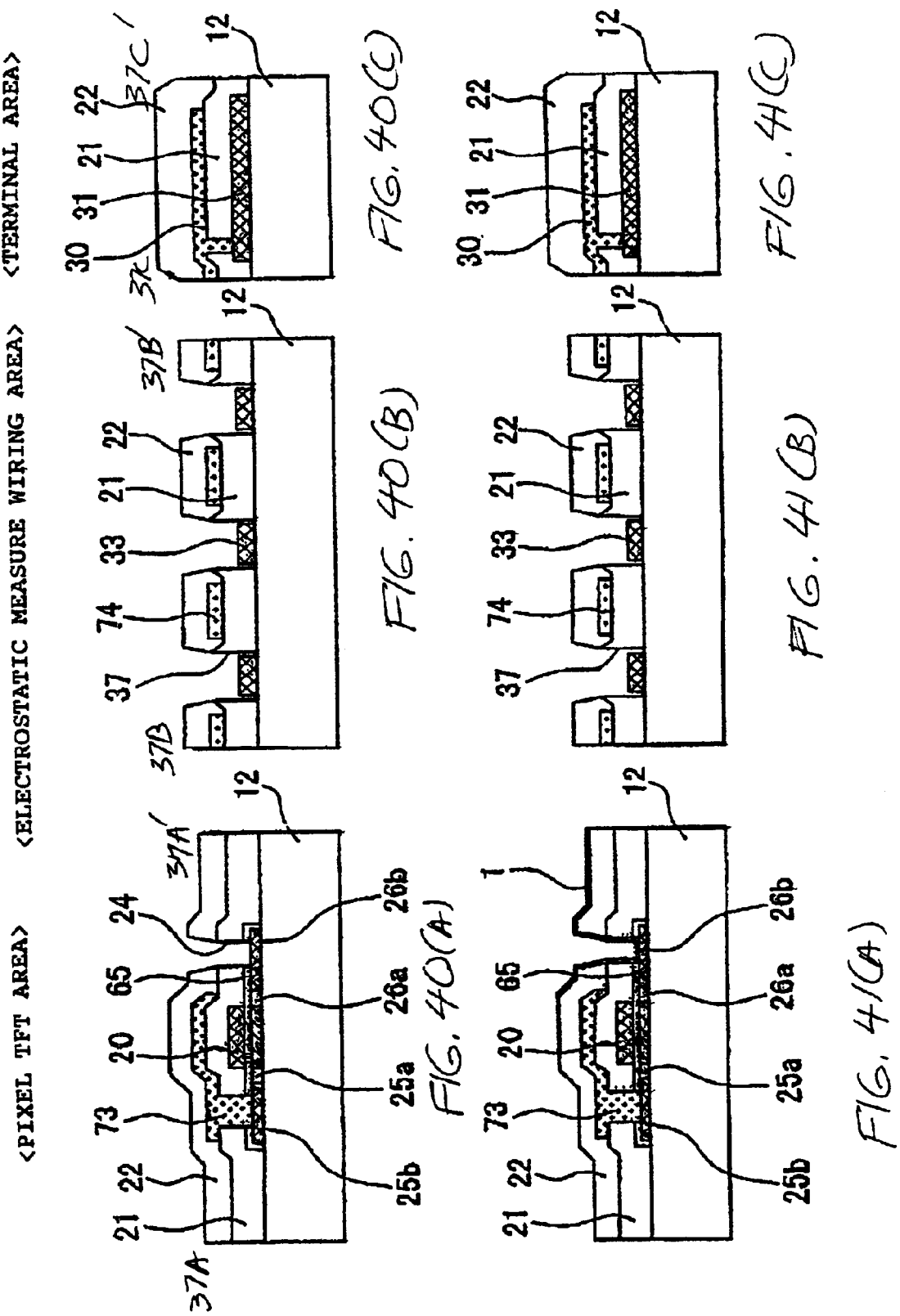

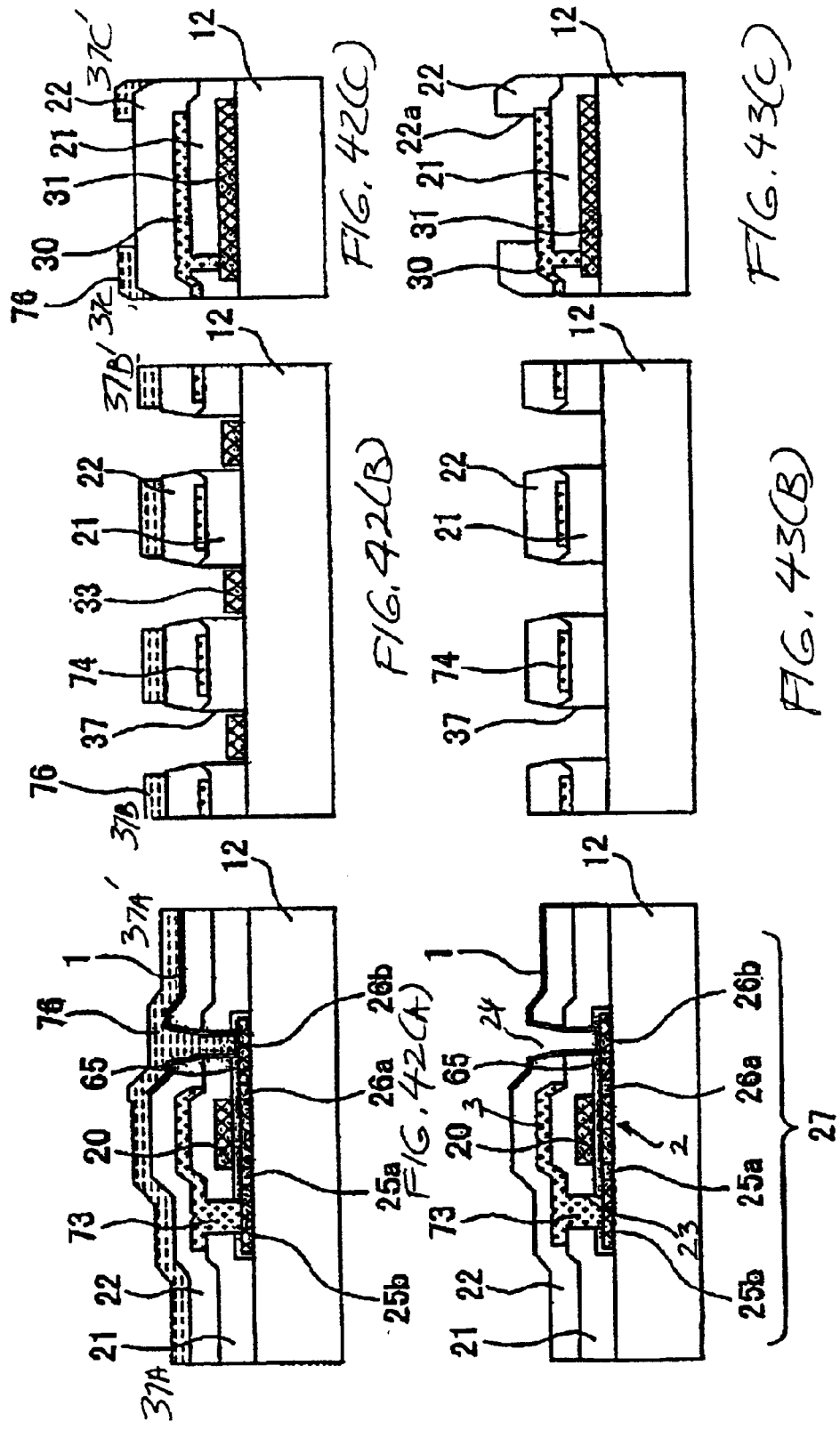

SEMICONDUCTOR DEVICE, ELECTRO-OPTICAL DEVICE SUBSTRATE, LIQUID CRYSTAL DEVICE SUBSTRATE AND MANUFACTURING METHOD THEREFOR, LIQUID CRYSTAL DEVICE, AND PROJECTION LIQUID CRYSTAL DISPLAY DEVICE AND ELECTRONIC APPARATUS USING THE LIQUID CRYSTAL DEVICE

BACKGROUND OF THE INVENTION

1. Field of Invention

The present invention relates to a semiconductor device, an electro-optical device substrate, a liquid crystal device substrate and a manufacturing method therefor, a liquid crystal device, and an electronic apparatus using the liquid crystal device. Particularly, the present invention relates to a technique for protecting circuits and elements on a substrate from static electricity produced in the process for manufacturing a liquid crystal device substrate and electric charge accumulated on the surface of an insulating substrate.

2. Description of the Related Art

In a liquid crystal cell which constitutes a liquid crystal device, for example, a plurality of data lines and a plurality of scanning lines are formed in a lattice form, and an active substrate and a counter substrate are disposed with a predetermined space therebetween. On the active matrix substrate, pixel electrodes, thin film transistors (abbreviated to "TFT" hereinafter) serving as pixel electrode drive switching elements, and the like are arranged in a matrix. On the counter substrate, a counter electrode, and the like are arranged. The active matrix substrate and the counter substrate are combined together by a sealing material containing a spacer so that the electrode formation surfaces thereof are opposed to each other with a predetermined space therebetween. A liquid crystal is sealed between both substrates.

SUMMARY OF THE INVENTION

In manufacturing the active matrix substrate having the above construction, TFTs are formed by using a semiconductor manufacturing process. However, in some cases, the substrate is charged with static electricity during the many steps of the manufacturing process, and electric charge is accumulated on the surface of the substrate due to the influence of the plasma processing step, or the like. Particularly, in the active matrix substrate for a liquid crystal device using an insulating substrate made of glass, quartz, or the like, there is no escape for the charged static electricity and accumulated charge, and thus defects such as electrostatic damage to TFTs, characteristic failures, etc. occur due to the presence of the static electricity and electric charge in some cases.

Therefore, a measure is taken in which wiring as a measure for static electricity is provided along the periphery of the substrate, and short-circuit wiring is formed to electrically connect signal lines such as scanning lines and data lines in the course of the manufacturing process so that the static electricity produced in the manufacturing process and electric charge are diffused to the wiring as the measure for static electricity in the periphery of the substrate through the short-circuit wiring, preventing unexpected excessive current due to the static electricity and electric charge from flowing into the internal TFTs, etc. Although the short-circuit wiring is required for protecting the elements such as the TFTs and wiring from static electricity in the course of the manufacturing process, the short-circuit wiring is not required after the manufacturing process. In addition, since inspection cannot be performed in a state wherein the signal lines are short-circuited in the step of inspecting electric properties, and the like, the short-circuit wiring must be cut by any method after the completion of the manufacturing process.

Therefore, the applicant proposed the method of forming and cutting short-circuit wiring disclosed in Japanese Unexamined Patent Publication No. 11-95257. This method is a method in which short-circuit wiring is formed and cut at the same time as the step of depositing any of various films, patterning, forming contact holes, etching, or the like, and is thus an excellent method because a special step for forming and cutting the short-circuit wiring need not be added. The construction of short-circuit wiring and the method of forming and cutting it disclosed in the above publication will be described below with reference to the drawings.

FIG. 2 is a schematic drawing of the construction of an active matrix substrate. As shown in this figure, in the active matrix substrate 7, a plurality of scanning lines 4 and a plurality of data lines 3 are provided on an insulating substrate 12 so as to cross each other, and pixels 8 are formed in a matrix in the respective regions partitioned by the scanning lines 4 and the data lines 3. The scanning lines 4 may be made of a polycrystalline silicon film, and the data lines 3 may be made of a metal film of aluminum or the like. The region where a plurality of pixels 8 are formed in a matrix is a pixel region 9 (image display region). In the periphery of the pixel region 9, a data line driving circuit 10 is formed for supplying image signals to the plurality of data lines 3, and scanning line driving circuits 11 are formed at both ends of the scanning lines 4, for supplying scanning signals for image selection to the scanning lines 4.

In the active matrix substrate 7, as a measure for static electricity, first short-circuit wiring 41 is formed for electrically connecting all signal wiring 16 and 17. Also, second short-circuit wiring 42 is formed for electrically connecting all scanning lines 4. Furthermore, third short-circuit wiring 43 is formed for electrically connecting all data lines 3. All short-circuit wiring 41, 42 and 43, which may be made of a polycrystalline silicon film of the same layer as the scanning lines 4, are electrically connected to each other. In FIG. 2, positions marked with "x" in the course of each of the short-circuit wiring 41, 42 and 43 is a cutting portion where each of the short-circuit wiring 41, 42 and 43 is cut after use.

FIG. 34 is an enlarged plan view showing the corner of a pixel region 9 of an active matrix substrate 7. As shown in this figure, pixel switching TFTs 2 are respectively provided in the pixels 8 to be connected to the scanning lines 4 and the data lines 3, and capacitance lines 6 are extended over a plurality of the pixels 8. As shown in FIGS. 43(A)–(C) which will be referred to below, each of the TFTs 2 may include a gate electrode 20 formed integrally with the scanning lines 4, and a semiconductor active film 27 which may include source regions 25a and 25b electrically connected to the data line 3 through a source contact hole 23, which passes through a first interlayer insulating film 21, and drain regions 26a and 26b electrically connected to a pixel electrode 1 through a drain contact hole 24 which passes through the first interlayer insulating film 21 and a second interlayer insulating film 22. The second short-circuit wiring 42 for electrically connecting the scanning lines 4, and the third short-circuit wiring 43 for electrically connecting the data lines 3 are formed as shown in FIG. 34. In this drawing, reference numeral 37 denotes a cutting portion of each of the short-circuit wiring 42 and 43, specifically a hole pattern (referred to as a "cutting hole" hereinafter) passing through the first interlayer insulating film 21 and the second interlayer insulating film 22.

FIG. 35 is a plan view showing the connecting structure between signal wiring and short-circuit wiring in the active matrix substrate 7 shown in FIG. 34. As shown in this figure, signal wiring 16 and 17 which may be made of a metal film of aluminum or the like, and are located in a layer different from the first short-circuit wiring 41. Therefore, the signal wiring 16 and 17 are electrically connected to the first short-circuit wiring 41 through contact holes 34 passing through the first interlayer insulating film 21 located therebetween. This connecting structure applies to the data lines 3, i.e., the data lines 3 are electrically connected to the third short-circuit wiring 43 through the contact holes 34 passing through the first interlayer insulating film 21 located therebetween. Like the second short-circuit wiring 42 and the third short-circuit wiring 43, the cutting holes 37 are provided in the course of the first short-circuit wiring 41.

FIG. 36 is a plan view showing the terminal area of the active matrix substrate 7. As shown in FIG. 36 and FIGS. 43(A)–(C) which will be referred to below, each of terminals 30 may include a pad exposed in each aperture 22a of the second interlayer insulating film 22, and can be connected to an external terminal. The terminals 30 are formed in a layer above the first interlayer insulating film 21. On the other hand, short-circuit wiring 33 for electrically connecting the plurality of the terminals 30 is formed in a layer below the first interlayer insulating film 21 at the same time as the scanning lines 4, and thus terminal under sheet films 31 which constitutes portions of the short-circuit wiring 33 are electrically connected to the terminals 30 through the contact holes 32 formed in the first interlayer insulating film 21. The cutting holes 37 are also provided in the course of the short-circuit wiring 33.

Next, the method of manufacturing the active matrix substrate 7 having the above construction is described with reference to FIGS. 37(A)–(C) to 43(A)–(C). These figures are drawings showing the steps of the exemplary method of manufacturing the active matrix substrate 7, where FIGS. 37(A) to 43(A) are sectional views taken along line 37A–37A' of FIG. 34 (sectional views of the pixel TFT area), FIGS. 37(B) to 43(B) are sectional views (sectional views of the electrostatic measure wiring area including the cutting portions of the short-circuit wiring) taken along line 37B–37B' of FIG. 35, and FIGS. 37(C) to 43(C) are sectional views (sectional views of the terminal area) taken along line 37C–37C' of FIG. 36. The active matrix substrate 7 is an example of so-called polysilicon TFT-type active matrix substrates using a polycrystalline silicon film as the semiconductor active film 27 of each TFT 2.

First, as shown in FIGS. 37(A)–(C), a polycrystalline silicon film 78 is formed on the surface of the insulating substrate 12, such as a glass substrate. As shown in FIGS. 38(A)–(C), the polycrystalline silicon film 78 is then patterned to form the island-like semiconductor active films 27 in the pixel TFT area. On the other hand, in the electrostatic measure wiring area and the terminal area, the polycrystalline silicon film 78 is completely removed. Next, gate oxide films 65 are formed on the surface of the semiconductor active films 27 by using a thermal oxidation method. Then, a conductive polycrystalline silicon film is formed over the entire surface, and then patterned to form gate electrodes 20 in the pixel TFT area. On the other hand, in the electrostatic measure wiring area and the terminal area, the polycrystalline silicon film is left as the short-circuit wiring 33 (corresponding to the first, second and third short-circuit wiring 41, 42 and 43) and the terminal under sheet films 31.

Next, as shown in FIGS. 39(A)–(C), the source regions 25a and 25b, and the drain regions 26a and 26b are formed in the semiconductor active films 27 by an ion implantation method, and then the first interlayer insulating film 21 is formed over the entire surface. Next, the source contact holes 23 and the contact holes 32 are formed in the portions, of the first interlayer insulating film 21, which correspond to the source regions 25b in the pixel TFT area, and the terminal under sheet films 31 in the terminal area, respectively. Next, a metal film of an aluminum film or the like is deposited over the entire surface, and then patterned to form source electrodes 73 as portions of the data lines 3 in the pixel TFT area. At the same time, signal wiring 74 is formed in the electrostatic measure wiring area, and the terminals 30 are formed in the terminal area. In the above-described steps, the first and third short-circuit wiring 41 and 43 are connected to the signal wiring 16 and 17 and the data lines 3.

Next, as shown in FIGS. 40(A)–(C), the second interlayer insulating film 22 is formed over the entire surface. Then, the drain contact holes 24 are formed in the portions of the first interlayer insulating film 21 and the second interlayer insulating film 22, which correspond to the drain regions 26b, in the pixel TFT area. At the same time, in the electrostatic measure wiring area, the cutting holes 37 are formed above the short-circuit wiring 33 to pass through the first interlayer insulating film 21 and the second interlayer insulating film 22.

Next, an indium tin oxide (referred to as "ITO" hereinafter) film is deposited over the entire surface, and then patterned to form the pixel electrodes 1 in the pixel TFT area, as, shown in FIGS. 41(A)–(C). On the other hand, in the electrostatic measure wiring area and the terminal area, the ITO film is completely removed.

Next, as shown in FIGS. 42(A)–(C), a resist mask 76 having apertures in regions to be exposed as the terminals 30 in the terminal area is formed on the second interlayer insulating film 22. The resist mask 76 covers the whole pixel TFT area, and has apertures at positions corresponding to the cutting holes 37 in the electrostatic measure wiring area. In the electrostatic measure wiring area, the apertures of the resist mask 76 are larger than the cutting holes 37.

Then, etching is performed by using the resist mask 76 to expose the terminals 30 from the apertures 22a of the second interlayer insulating film 22 in the terminal area, as shown in FIGS. 43(A)–(C). Then, in the electrostatic measure wiring area, the short-circuit wiring 33 is cut to electrically separate the wiring from each other.

In this way, the above-described method is capable of forming the short-circuit wiring 33 at the same time as the formation of the scanning lines 4 and the gate electrodes 20 so that in short-circuiting wiring located in a layer different from the short-circuit wiring 33, as in the data lines 3 and the signal wiring 74 (16, 17), contact holes are formed at the same time as the formation of the source contact holes 23 of the TFTs 2 so that the data lines 3 and the signal wiring 74 can be electrically connected to the short-circuit wiring 33.

The method of cutting the short-circuit wiring 33 is described in detail below. As separately shown in FIG. 44(A), the second interlayer insulating film 22 is formed, and then the cutting holes 37 are formed at positions above the short-circuit wiring 33 to pass through the first interlayer insulating film 21 and the second interlayer insulating film 22 at the same time as the formation of the drain contact holes 24 of the TFTs 2. Then, the pixel forming ITO film formed above these holes is removed, and then the photolithography step is carried out to expose the terminals of the terminal areas. However, in the resist mask 76, the apertures are formed not only above the terminals but also above the cutting holes 37. This is because it is desired to perform subsequent etching for cutting the short-circuit wiring by using the resist mask 76 without increasing the photolithography step. Then, the second interlayer insulating film 22 is etched to expose the terminals. Usually, as the etching, only wet etching is employed, or a method which may include dry etching to some extent, and then wet etching is frequently employed. This is because an insulating substrate is used as an active matrix substrate, particularly for a liquid crystal display, and it is thus desired to avoid the accumulation of charge due to exposure of the surface of the substrate to plasma in dry etching.

Therefore, a silicon oxide film type insulating film is generally used as the second interlayer insulating film 22, and thus the second interlayer insulating film 22 deposited above the terminals is etched with an etchant capable of etching the silicon oxide film. At the same time, even if a native oxide film is formed on the surface of the polycrystalline silicon film which constitutes the short-circuit wiring 33 exposed from the cutting holes 37, the native oxide film is etched to create the state in which the surface of the short-circuit wiring 33 is slightly over-etched, as shown in FIG. 44(B). The removal of the native oxide film has the effect of ensuring etching of the polycrystalline silicon film, which constitutes the short-circuit wiring, in the next step of cutting the short-circuit wiring. Then, as shown in FIG. 44(C), the polycrystalline silicon film exposed from the cutting holes 37 is etched by dry etching or the like to securely cut the short-circuit wiring 33 at these positions.

In recent years, a liquid crystal display has been increasingly required to have higher function and higher performance, and TFT used for an active matrix substrate has been required to have higher-speed performance. In this case, the conversion of polycrystalline silicon conventionally used as a semiconductor active film material for TFT, which greatly influences the operation speed, to single crystal silicon has been studied. In the field of the semiconductor manufacturing process, the SOI (Silicon On Insulator) technique of forming a single crystal silicon thin film on an insulating film is conventionally known, and a SIMOX (Separation by Implanted Oxygen) technique, a wafer laminating technique, and the like are used as means for manufacturing SOI wafers. Particularly, an SOI wafer manufactured by the wafer laminating technique is preferred from the viewpoints of the good crystallinity of an SOI layer, and the wide range of material selection permitting the use of a transparent material for a support substrate. Therefore, in realizing a single crystal silicon TFT, an SOQ (Silicon On Quartz) substrate produced by the bonding method is studied as a selection of material for the active matrix substrate for a liquid crystal display.

However, in actually manufacturing the active matrix substrate by using the SOQ substrate produced by the bonding method, the use of the electrostatic protecting measure produces the problems below. In the SOQ substrate produced by the bonding method, a single crystal silicon substrate which may include a silicon oxide film formed on the surface thereof by a thermal oxidation method, and a quartz substrate are combined by heat treatment with the silicon oxide film side adhering to the quartz substrate, and thus an interface (referred to as a "bonding interface" hereinafter) having relatively weak crystal bonding is present between the silicon oxide film and the quartz substrate.

In use of the SOQ substrate, the sectional structure in the step of cutting the short-circuit wiring is as shown in FIG. 26(B). Namely, as shown in this figure, a buried oxide film 62 which may include a silicon oxide film is bonding on a quartz substrate 63, the interface between the quartz substrate 63 and the buried oxide film 62 being the bonding interface. Then, the short-circuit wiring 33 is formed on the buried oxide film 62, and the cutting holes 37 for exposing the short-circuit wiring 33 are formed in the first interlayer insulating film 21 and the second interlayer insulating film 22 bonding in turn on the buried oxide film 62. In this sectional structure, according to the above-described procedure, the second interlayer insulating film 22 is first etched for exposing the terminals of the terminal areas. In the use of the bonding SOQ substrate, the buried oxide film 62 including a silicon oxide film serves as a base of the short-circuit wiring 33, and is thus etched at the same time as the second interlayer insulating film 22. The thickness of the buried oxide film 62 is in the range of, for example, several tens nm to several nm according to the type of the SOQ substrate, but a film of several hundreds nm is frequently used. In this case, the thickness of the buried oxide film 62 is significantly smaller than the thickness of the second interlayer insulating film 22 in some cases.

Under these conditions, when the second interlayer insulating film 22 is etched until the terminals are exposed, the buried oxide film 62 below the short-circuit wiring 33 is completely etched in the course of etching so that the etchant reaches the bonding interface. However, the structure shown in FIGS. 40(A)–(C) causes no problem because the interface between the substrate and the insulating film bonding thereon is strong, while the SOQ substrate having the bonding interface causes a problem in which the etchant easily permeates because the weak crystal bonding of the bonding interface, as described above, thereby etching the buried oxide film 62 to deeply cut it along the bonding interface, as shown in FIG. 26(B). This state causes a problem in which cracks C occur in the insulating film over a region including the buried oxide film 62, the first interlayer insulating film 21 and the second interlayer insulating film 22, and extreme cases, the insulating film peels in the cracked portions.

In order to avoid at least this problem, dry etching is possibly used for etching the second interlayer insulating film so as to prevent the etchant from permeating along the bonding interface. However, dry etching is undesirable because electric charge is accumulated on the surface of the substrate, and damage occurs due to plasma. In another possible method, the second interlayer insulating film is etched in different steps in the terminal area and the electrostatic measure wiring area. In this case, the number of the steps is increased, which may undesirably deteriorate the advantage of the method capable of forming and cutting short-circuit wiring while preventing the complication of a method as much as possible. Even when a complete electrostatic measure is taken, the measure is meaningless when it complicates the manufacturing process to significantly increase the manufacturing cost and TAT (Turn Around Time, the time from start work to the completion of a product).

The present invention has been achieved for solving at least the above problems, and one object of the present invention is to provide methods and systems for securely preventing cracking and peeling of an insulating film in the periphery of a cutting portion in cutting short-circuit wiring by etching in a substrate used for various electronic devices such as a liquid crystal device, an electro-optical device, or a semiconductor device in which an electrostatic measure is taken by the above-described short-circuit wiring. Another object of the present invention is to provide methods and systems for preventing complication of a conventional manufacturing process as much as possible in preventing cracking and peeling of the insulating film.

A semiconductor device of an exemplary embodiment of an exemplary embodiment of the present invention may include a substrate, a base oxide film provided on the substrate, a plurality of signal lines, and short-circuit wiring provided on the base oxide film for electrically connecting the plurality of signal lines during a manufacturing process. A hole is provided in an insulating film covering the short-circuit wiring for cutting the short-circuit wiring by etching to release the signal lines from a short-circuit state. An etching stop layer is provided in a region wider than at least the hole between the short-circuit wiring and the base oxide film, and may include a film having resistance to etching of an oxide film formed on the surface of the short-circuit wiring.

An electro-optical device substrate of an exemplary embodiment of the present invention may constitute one of a pair of substrates of an electro-optical device in which an electro-optical material is held between the pair of substrates. The electro-optical device substrate may include a substrate, a base oxide film provided on the substrate, a plurality of signal lines, and short-circuit wiring provided on the base oxide film, for electrically connecting the plurality of signal lines during a manufacturing process. A hole is provided in an insulating film covering the short-circuit wiring for cutting the short-circuit wiring by etching to release the signal lines from a the short-circuit state. An etching stop layer is provided in a region wider than at least the hole between the short-circuit wiring and the base oxide film, and may include a film having resistance to etching of an oxide film formed on the surface of the short-circuit wiring.

A liquid crystal device substrate of an exemplary embodiment of the present invention may constitute one of a pair of substrates of a liquid crystal device in which a liquid crystal is held between the pair of substrates. The liquid crystal device substrate may include a substrate, a base oxide film provided on the substrate, a plurality of signal lines, and short-circuit wiring provided on the base oxide film for electrically connecting the plurality of signal lines during a manufacturing process. A hole is provided in an insulating film covering the short-circuit wiring for cutting the short-circuit wiring by etching to release the signal lines from a short-circuit state. An etching stop layer is provided in a region wider than at least the hole between the short-circuit wiring and the base oxide film, and may include a film having resistance to etching of an oxide film formed on the surface of the short-circuit wiring.

It should be understood that although "electrically connecting the plurality of signal lines in a manufacturing step" may be described to clarify the function of "short-circuit wiring", "short-circuit wiring" is not used only for a measure for static electricity. As described above, "short-circuit wiring" may be used for allowing electric charge escape on the substrate due to various causes, such as static electricity produced in the manufacturing process and accumulated charge in plasma processing.

In various exemplary embodiments of the present invention, "a film having resistance to etching of an oxide film" may mean a film which has some extent of selectivity to etching of the oxide film, and which may be partially etched under the etching conditions of the manufacturing process as long as the film is not completely etched with the base not etched.

In the structure in which the short-circuit wiring is formed directly on the base oxide film, etching as pre-treatment for removing the oxide film formed on the surface of the short-circuit wiring during cutting of the short-circuit wiring causes etching of the base oxide film to excessively progress etching due to permeation of the etchant into the interface between the substrate and the base oxide film, thereby cracking or peeling the insulating film. On the other hand, in the structure of the various exemplary embodiments of the present invention, the etching stop layer is interposed between the short-circuit wiring and the base oxide film, and thus etching of the oxide film formed on the surface of the short-circuit wiring is stopped in the etching stop layer because the etching stop layer has resistance to etching of the oxide film, preventing the base oxide layer from being etched. In addition, the structure of the present invention causes no trouble in the subsequent step of cutting the short-circuit wiring. It is thus possible to securely prevent the occurrence of cracking and peeling of the insulating film accompanying the step of cutting the short-circuit wiring. It should be appreciated that the present invention is not limited to a liquid crystal display substrate, and can also be applied to various electronic devices such as a semiconductor device, or an electro-optical device. The use of the present invention can realize an electronic device having high reliability and high performance.

Although the etching stop layer may be exclusively separately formed, the etching stop layer is preferably rationally formed by using an arbitrary film used in a layer below the short-circuit wiring and used at positions other than the short-circuit wiring forming positions in order to prevent complication of the manufacturing process.

In an application of the various exemplary embodiments of the present invention to a liquid crystal display substrate, for example, a TFT array substrate using TFTs as pixel switching elements, a semiconductor active film which constitutes source regions, drain regions, channel regions, etc. of the TFTs generally may include a silicon film. In this case, preferably, the etching stop layer may include the silicon film in the same layer as the semiconductor active film, and the short-circuit wiring is made of the gate electrode material of the TFTs.

In this construction, the etching stop layer and the short-circuit wiring can be formed at the same time as the formation of the TFTs.

In this case, the insulating film which constitutes the gate insulating films of the TFTs is further interposed between the short-circuit wiring and the etching stop layer.

When the etching stop layer has conductivity, even if the short-circuit wiring is cut, contact between the short-circuit wiring and the etching stop layer short-circuits the cut portions of the short-circuit wiring through the etching stop layer, thereby possibly substantially failing to cut the short-circuit wiring. However, the above-described construction enables reliable cutting of the short-circuit wiring because the insulating film, which constitutes the gate insulating films of the TFTs, is interposed between the short-circuit wiring and the etching stop layer.

As the silicon film used for the semiconductor active films of the TFTs, any one of a polycrystalline silicon film, an amorphous silicon film, and a single crystal silicon film may be used. However, the use of the single crystal silicon film having high carrier mobility among these films permits an attempt to increase the operation speed of the TFTs. In use of the single crystal silicon film, the bonding SOI substrate having the bonding interface between the substrate and the base oxide film can be used as a raw material substrate for the substrate, the base oxide film and the single crystal silicon film.

Some methods of depositing the base oxide film have a problem in which the etchant permeates into the interface between the substrate and the base oxide film. However, when the bonding SOI substrate having the bonding interface between the substrate and the base oxide film is used as the raw material substrate, the problem of permeation of the etchant is generally more significant than a case in which the base oxide film is deposited on the substrate. Therefore, the present invention is suitably applied to a liquid crystal display substrate which may include the bonding SOI substrate having single crystal silicon TFTs.

In the connection structure between the signal lines and the short-circuit wiring, when the signal lines and the short-circuit wiring are formed in the same wiring layer, the signal lines and the short-circuit wiring may be integrally formed without the need for connection. On the other hand, when the signal lines and the short-circuit wiring are formed in different wiring layers, the signal lines and the short-circuit wiring may be electrically connected to each other through contact holes passing through the insulating film interposed therebetween.

A method of manufacturing a liquid crystal device substrate of an exemplary embodiment of the present invention is provided for manufacturing a liquid crystal device substrate which may constitute one of a pair of substrates of a liquid crystal device in which a liquid crystal is held between the pair of substrates, and which may include a substrate, a base oxide film provided on the substrate, a plurality of signal lines, and short-circuit wiring provided on the base oxide film for electrically connecting the plurality of signal lines during a manufacturing process. The method may include the step of forming, on the base insulating film, an etching stop layer which may include a film having resistance to etching of an oxide film formed on the short-circuit wiring, the step of forming the short-circuit wiring on the base insulating film so that the short-circuit wiring crosses the etching stop layer, the step of forming an insulating film to cover the short-circuit wiring, the step of forming a hole in the insulating film above the etching stop layer formation region for cutting the short-circuit wiring by etching in releasing the signal lines from a short-circuit state, the step of etching out the oxide film formed on the surface of the short-circuit wiring through the hole, and the step of cutting the short-circuit wiring through the hole.

Preferably, the etching stop layer is formed before the formation of the short-circuit wiring, and may include an arbitrary film used at positions other than the short-circuit wiring formation positions in the liquid crystal device substrate.

The method of manufacturing a liquid crystal device substrate of the present invention can easily manufacture the liquid crystal device substrate of the present invention, and can obtain the effect of preventing the occurrence of cracking and peeling of the insulating film accompanying the step of cutting the short-circuit wiring.

More specifically, the method of manufacturing a liquid crystal device substrate of an exemplary embodiment of the present invention is provided for manufacturing a liquid crystal device substrate which may constitute one of a pair of substrates of a liquid crystal device in which a liquid crystal is held between the pair of substrates, and which may include a substrate, a base oxide film provided on the substrate, a plurality of signal lines, a plurality of pixel electrodes respectively connected to the plurality of signal lines, short-circuit wiring provided on the base oxide film for electrically connecting the plurality of signal lines during a manufacturing process, and TFTs each including a silicon film as a semiconductor active film. The method may include: the step of patterning a silicon film on the base insulating film to form the semiconductor active films of the TFTs and form an etching stop layer having resistance to etching of a silicon oxide film, the step of forming a silicon oxide film on the remaining silicon film, the step of depositing a gate electrode material film for the TFTs over the entire surface and patterning it to form scanning lines which constitute the signal lines, gate electrodes of the TFTs, and the short-circuit wiring which crosses the etching stop layer, the step of introducing an impurity into the semiconductor active films of TFTs to form source and drain regions, the step of forming a first interlayer insulating film to cover the TFTs and the short-circuit wiring, the step of patterning the first interlayer insulating film to form source contact holes which pass through the first interlayer insulating film and reach the source regions of the TFTs, the step of depositing a conductive film and patterning it to form data lines which constitute the signal lines electrically connected to the source regions through the source contact holes and form terminals, the step of forming a second interlayer insulating film to cover the data lines and the terminals, the step of patterning the second interlayer insulating film and the first interlayer insulating film to form drain contact holes, which pass through both interlayer insulating films and reach the drain regions of the TFTs, and form holes in the etching stop layer forming regions for cutting the short-circuit wiring, the step of forming pixel electrodes electrically connected to the drain regions through the drain contact holes, the step of forming a mask pattern on the second internal insulating film and wit-etching the second interlayer insulating film to expose the surfaces of the terminals and removing a native oxide film formed on the short-circuit wiring through the holes, and the step of cutting the short-circuit wiring by etching through the holes.

Where each of the semiconductor active films of the TFTs and the silicon film, which constitutes the etching stop layer includes a single crystal silicon film, the bonding SOI substrate can be used as the raw material substrate.

In the method of manufacturing a liquid crystal device substrate of another exemplary embodiment of the present invention, the etching stop layer is formed at the same time as the semiconductor active films of the TFTs, and the short-circuit wiring is formed at the same time as the gate electrodes of the TFTs. Therefore, the semiconductor active films and the etching stop layer may include a silicon film, and the use of a polycrystalline silicon film as the gate electrode material for the TFTs causes the formation of the short-circuit wiring which may include the polycrystalline silicon film. Then, the source regions and the drain regions of the TFTs are formed, and the TFTs are covered with the first interlayer insulating film. However, the data lines connected to the source regions are formed at the same time as the formation of the terminals for connection to external wiring at the ends of various signal wires by using the same layer as the data lines.

Furthermore, the data lines and the terminals are coated with the second interlayer insulating film, and the drain contact holes are formed for connecting the pixel electrodes to the drain regions. However, by using this step, holes are formed above the short-circuit wiring. Although the pixel electrodes are then formed in the pixel region, in some cases, the native oxide film is formed on the surface of the short-circuit wiring, for example, which may include the polycrystalline silicon film, during the passage of this step. In some cases, the presence of the native oxide film hinders the short-circuit wiring from being sufficiently etched in the subsequent step of cutting the short-circuit wiring. Therefore, the step of removing the native oxide film on the surface of the short-circuit wiring is required before the cutting step. However, in the exemplary embodiments of the present invention, this step is performed at the same time as the step of forming the terminals. The method of the exemplary embodiments of the present invention does not have the problem of cracking the insulating film because of the presence of the etching stop layer. Finally, the short-circuit wiring can be cut by etching through the holes.

In this way, in the method of manufacturing a liquid crystal device substrate of the various exemplary embodiments of the present invention, various films are deposited, patterned, and etched in the same step, and thus the short-circuit wiring is formed and cut at the same time as the formation of the TFTs and the terminals, thereby preventing complication of the manufacturing process as compared with a case including no electrostatic measure (without forming the short-circuit wiring). Strictly, etching of the short-circuit wiring is, of course, added, but etching may be performed by using the mask pattern used in the step of exposing the terminals, without increasing the number of the photolithography steps. Therefore, an electrostatic measure can be carried out with less change in the time and labor required for the process, as compared with other manufacturing processes. In addition, the manufacturing method of the exemplary embodiments of the present invention may include the step of cutting the short-circuit wiring after the step of exposing the terminals nearest to the final step of the manufacturing process, and thus the short-circuit wiring functions in the most of the steps of the manufacturing process, thereby providing the effective electrostatic measure.

A liquid crystal device of the various exemplary embodiments of the present invention may include a liquid crystal held between a pair of substrates, wherein at least one of the pair of substrates may include the above-described exemplary embodiments of the liquid crystal device substrate of the present invention.

By using the liquid crystal device substrate of the exemplary embodiments of the present invention, a liquid crystal device exhibiting high image quality and high performance, and producing less display defect due to electrostatic damage or the like can be realized.

A projection liquid crystal display of various exemplary embodiments of the present invention may include the liquid crystal device of the exemplary embodiments of the present invention serving as a light valve, so that light emitted from a light source is modulated by the liquid crystal device. The modulated light is enlarged and projected on a projection screen by a projection optical device.

Particularly, a projection liquid crystal display has the tendency that display defects can easily be seen by the user because an image is enlarged and projected, but a projected image having good image quality and less defect due to electrostatic damage or the like can be obtained.

An electronic apparatus of various exemplary embodiments of the present invention may include the above-described exemplary embodiments of the liquid crystal display of the present invention.

By using the liquid crystal device of the various exemplary embodiments of the present invention, an electronic apparatus having less defect due to electrostatic damage or the like, and high image quality and high performance can be realized.

BRIEF DESCRIPTION OF THE DRAWINGS

FIGS. 9(A)–(C) are sectional views showing a step of the method of manufacturing the active matrix substrate of FIG. 2;

FIGS. 10(A)–(C) are sectional views showing a subsequent step of the method of FIGS. 9(A)–(C);

FIGS. 11(A)–(C) are sectional views showing a subsequent step of the method of FIGS. 10(A)–(C);

FIGS. 12(A)–(C) are sectional views showing a subsequent step of the method of FIGS. 11(A)–(C);

FIGS. 13(A)–(C) are sectional views showing a subsequent step of the method of FIGS. 12(A)–(C);

FIGS. 14(A)–(C) are sectional views showing a subsequent step of the method of FIGS. 13(A)–(C);

FIGS. 15(A)–(C) are sectional views showing a subsequent step of the method of FIGS. 14(A)–(C);

FIGS. 16(A)–(C) are sectional views showing a subsequent step of the method of FIGS. 15(A)–(C);

FIGS. 17(A)–(C) are sectional views showing a subsequent step of the method of FIGS. 16(A)–(C);

FIGS. 18(A)–(C) are sectional views showing a subsequent step of the method of FIGS. 17(A)–(C);

FIGS. 19(A)–(C) are sectional views showing a subsequent step of the method of FIGS. 18(A)–(C);

FIGS. 20(A)–(C) are sectional views showing a subsequent step of the method of FIGS. 19(A)–(C);

FIGS. 21(A)–(C) are sectional views showing a subsequent step of the method of FIGS. 20(A)–(C);

FIGS. 22(A)–(C) are sectional views showing a subsequent step of the method of FIGS. 21(A)–(C);

FIGS. 23(A)–(C) are sectional views showing a subsequent step of the method of FIGS. 22(A)–(C);

FIGS. 24(A)–(C) are sectional views showing a subsequent step of the method of FIGS. 23(A)–(C);

FIGS. 25(A)–(C) are sectional views showing a subsequent step of the method of FIGS. 24(A)–(C);

FIGS. 26(A)–(B) are drawings showing a sectional structure in cutting short-circuit wiring formed on an active matrix substrate, in which FIG. 26(B) shows an embodiment of the present invention, and FIG. 26(A) shows a comparative example;

FIG. 30 is an enlarged plan view showing the corner of the pixel region of the active matrix substrate of FIG. 29;

FIGS. 31(A)–(B) are drawings showing the entire construction of a liquid crystal device of the various exemplary embodiments of the present invention, in which FIG. 31(A) is a plan view, and FIG. 31(B) is a sectional view taken along line 31B-31B' of FIG. 31(A);

FIGS. 37(A)–(C) are sectional views showing a step of the method of manufacturing the active matrix substrate of FIG. 34;

FIGS. 38(A)–(C) are sectional views showing a subsequent step of the method of FIGS. 37(A)–(C);

FIGS. 39(A)–(C) are sectional views showing a subsequent step of the method of FIGS. 38(A)–(C);

FIGS. 40(A)–(C) are sectional views showing a subsequent step of the method of FIGS. 39(A)–(C);

FIGS. 41(A)–(C) are sectional views showing a subsequent step of the method of FIGS. 40(A)–(C);

FIGS. 42(A)–(C) are sectional views showing a subsequent step of the method of FIGS. 41(A)–(C);

FIGS. 43(A)–(C) are sectional views showing a subsequent step of the method of FIGS. 42(A)–(C)

DETAILED DESCRIPTION OF PREFERRED EMBODIMENTS

First Embodiment

A first exemplary embodiment of the present invention will be described below with reference to FIG. 1 to FIGS. 25(A)–(C).

Figure 1:
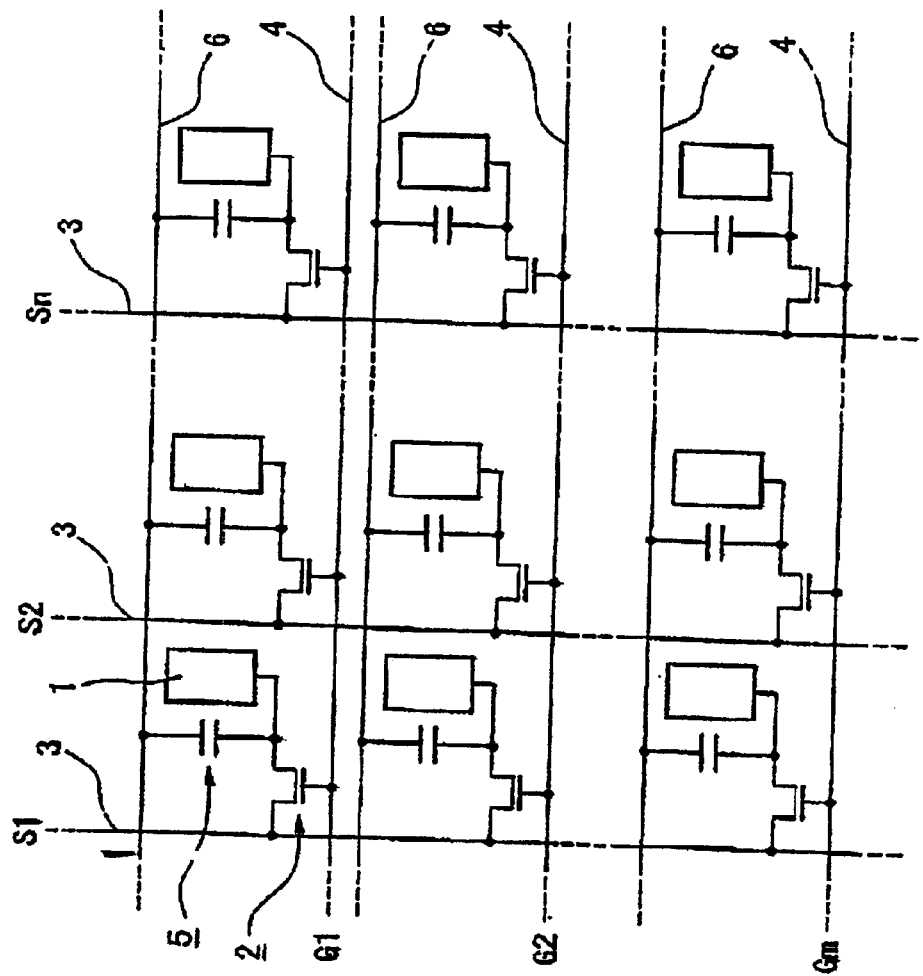
FIG. 1 is a drawing of the equivalent circuits of an image display region of a liquid crystal device according to a first exemplary embodiment of the present invention.
Figure 2:
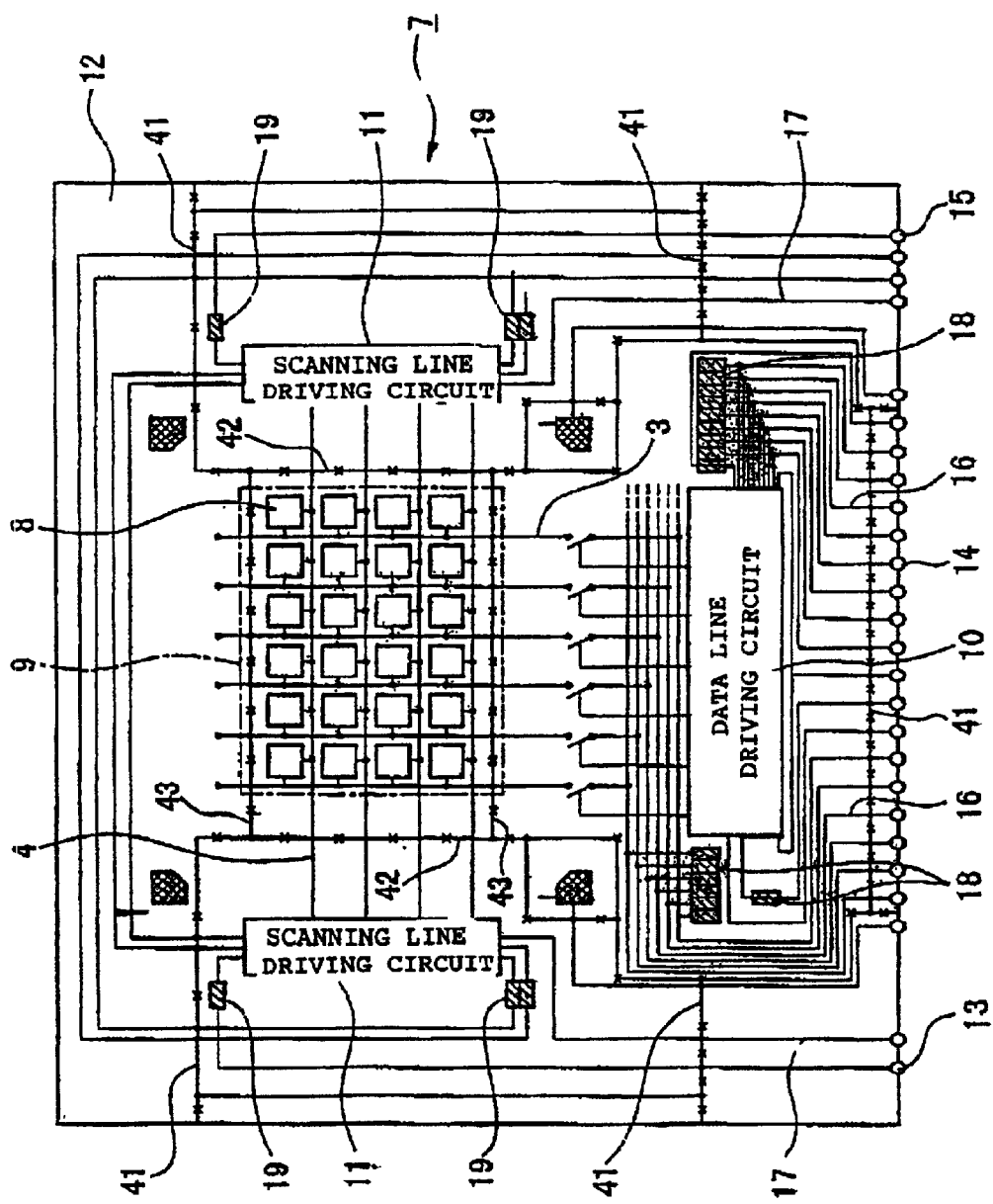
FIG. 2 is a block diagram schematically showing the construction of an active matrix substrate (liquid crystal device substrate), which constitutes the liquid crystal device of FIG. 1.
Figure 3:
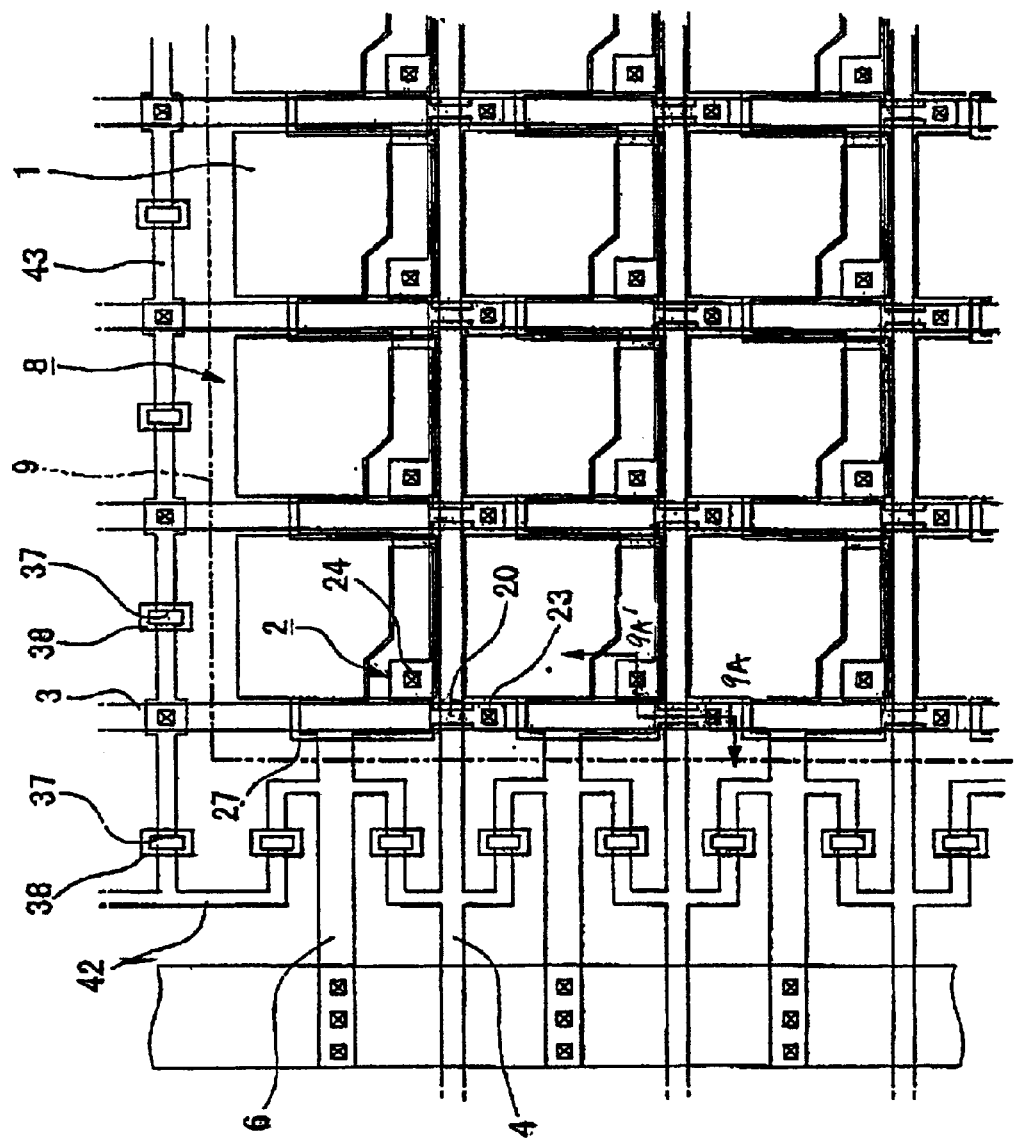
FIG. 3 is an enlarged plan view showing the corner of the pixel region of the active matrix substrate of FIG. 2.

FIG. 1 is a drawing of equivalent circuits including various elements, wiring, and the like in a plurality of pixels which constitute an image display region of a liquid crystal device of this embodiment. FIG. 2 is a block diagram schematically showing the construction of an active matrix substrate (liquid crystal device substrate) with built-in driving circuits used for a liquid crystal device. FIG. 3 is an enlarged plan view showing the corner of the pixel region of the active matrix substrate.

In all drawings below, the planar dimensions, thickness, etc. of layers and members are shown on different scales in order that each of the layers and members shown in the drawings has a recognizable size.

Construction of Main Portion of Liquid Crystal Device

In the liquid crystal device of this embodiment, as shown in FIG. 1, a plurality of pixels are arranged in a matrix to form the image display region and may include a plurality of pixel electrodes 1 and a plurality of TFTs 2 for controlling the pixel electrodes 1 which are arranged in a matrix, and data lines 3 (signal lines) for supplying image signals are electrically connected to the source regions of the TFTs 2. Image signals S1, S2, . . . , Sn written on the data lines 3 may be supplied in this order in a line sequential manner, or supplied to a plurality of adjacent data lines 3 for each group. In addition, scanning lines 4 (signal lines) are electrically connected to the gate electrodes of the TFTs 2, and scanning signals G1, G2, . . . , Gm are pulsatively applied to the scanning lines 4 in this order in a line sequential manner with predetermined timing. The pixel electrodes 1 are electrically connected to the drain regions of the TFTs 2, and the TFTs 2 serving as switching elements are closed for a predetermined period of time so that the image signals S1, S2, . . . , Sn supplied from the data lines 3 are written with predetermined timing.

The image signals S1, S2, . . . , Sn in the predetermined level written on the liquid crystal through the pixel electrodes 1 are maintained between the liquid crystal and a counter electrode (described later) formed on a counter substrate (described later) for a predetermined time. In order to prevent a leakage of the maintained image signals, storage capacitors 5 are added in parallel with liquid crystal capacitances formed between the pixel electrodes 1 and the counter electrode. Reference numeral 6 denotes a capacitance line which constitutes the upper electrodes of the storage capacitors 5. The voltage of the pixel electrodes 1 is maintained for a time of thousands times as long as the time of application of the source voltage. As a result, the holding property is further improved to realize a liquid crystal device having high contrast. As the method of forming the storage capacitors, capacitances may be formed by using the scanning lines 4 instead of providing the capacitance lines.

In the active matrix substrate 7 used in the liquid crystal device of this embodiment, as shown in FIGS. 2 and 3, the plurality of scanning lines 4 and the plurality of data lines 3 are provided to cross each other on an insulating substrate 12 so that regions partitioned by the scanning lines 4 and the data lines 3 are arranged as pixels 8 in a matrix. The scanning lines 4 may include a polycrystalline silicon film doped with an impurity, and the data lines 3 may include a metal film or alloy film of aluminum or the like. The region including the plurality of pixels 8 formed in a matrix is the pixel region (image display region) 9. Furthermore, a data line driving circuit 10 is formed on the periphery of the pixel region 9 for supplying the image signal to the plurality of data lines 3, and scanning line driving circuits 11 are formed at both ends of the scanning lines 4 for supplying scanning signals for image selection to the scanning lines 4.

As shown in FIG. 2, many terminals 13, 14, and 15 to which various signals are input, and each of which may include a metal film such as an aluminum film, a metal silicide film, or a conductive film such as an ITO film are formed at the side edge where the data line driving circuit 10 is provided, and a plurality of signal wiring 16 and 17 each including a low-resistance metal film or a metal silicide film are extended from these terminals 13, 14 and 15, for driving the scanning line driving circuits 11 and the data line driving circuit 10. In addition, electrostatic protection circuits 18 and 19 are formed at intermediate positions of the signal wiring 16 and 17.

As shown in FIGS. 1 and 3, each of the pixels 8 includes the pixel switching TFT 2 connected to the corresponding scanning line 4 and data line 3. Also, the capacitance line 6 is formed for each of the pixels 8. The TFT 2 may include a gate electrode 20 formed integrally with the scanning lines 4, and a semiconductor active film 27 including source regions 25a and 25b electrically connected to the data lines 3 through a source contact hole 23 passing through a first interlayer insulating film 21, drain regions 26a and 26b electrically connected to each pixel electrode 1 through a drain contact hole 24 passing through the first interlayer insulating film 21 and a second interlayer insulating film 22, as shown in FIGS. 25(A)–(C) which will be referred to later. In this embodiment, the semiconductor active film 27 may include a single crystal silicon film which basically includes a single crystal silicon layer of a bonding SOQ substrate.

Figure 4:
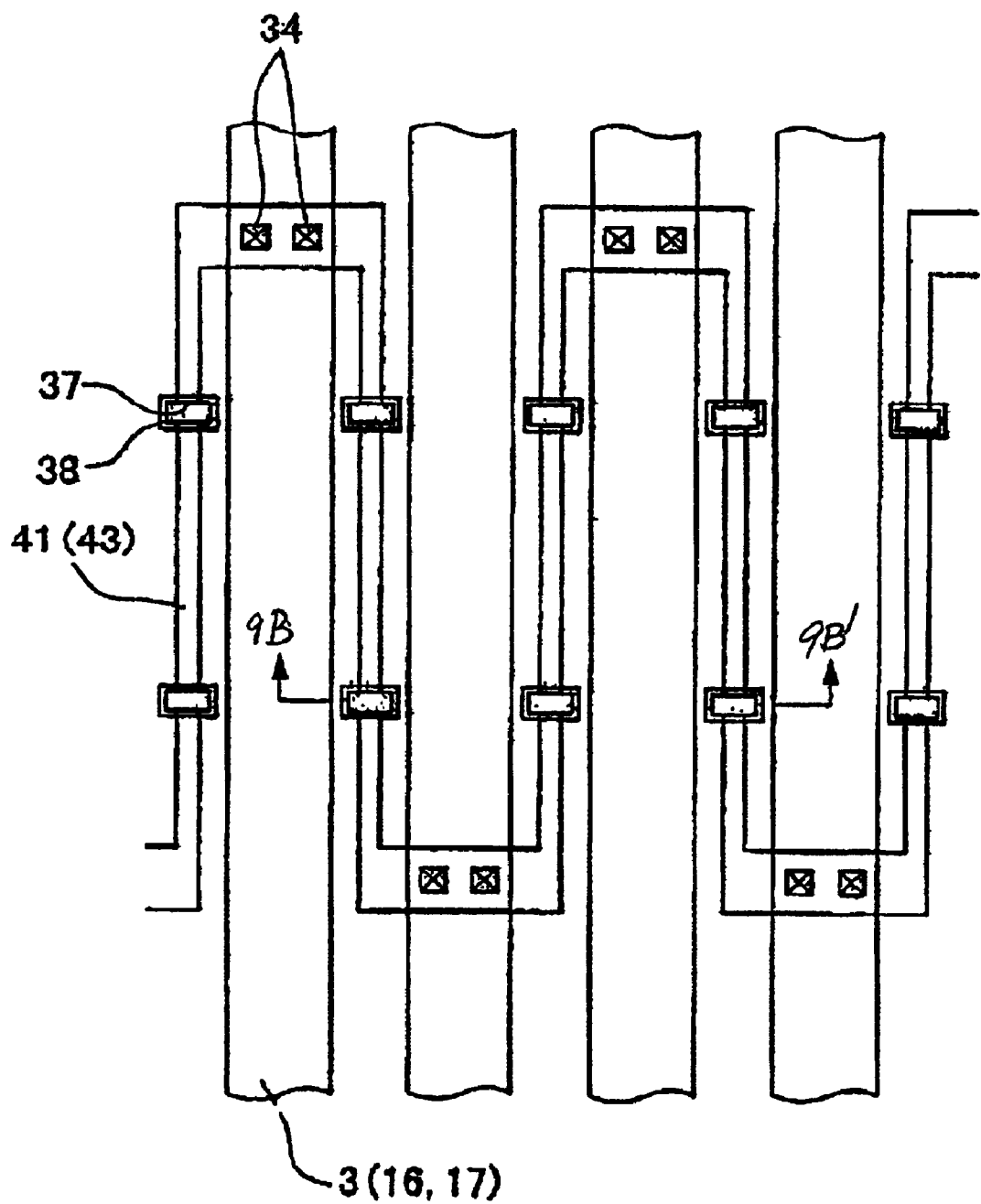
FIG. 4 is a plan view showing the connection structure between signal wiring and short-circuit wiring in the active matrix substrate of FIG. 2.
Figure 5:
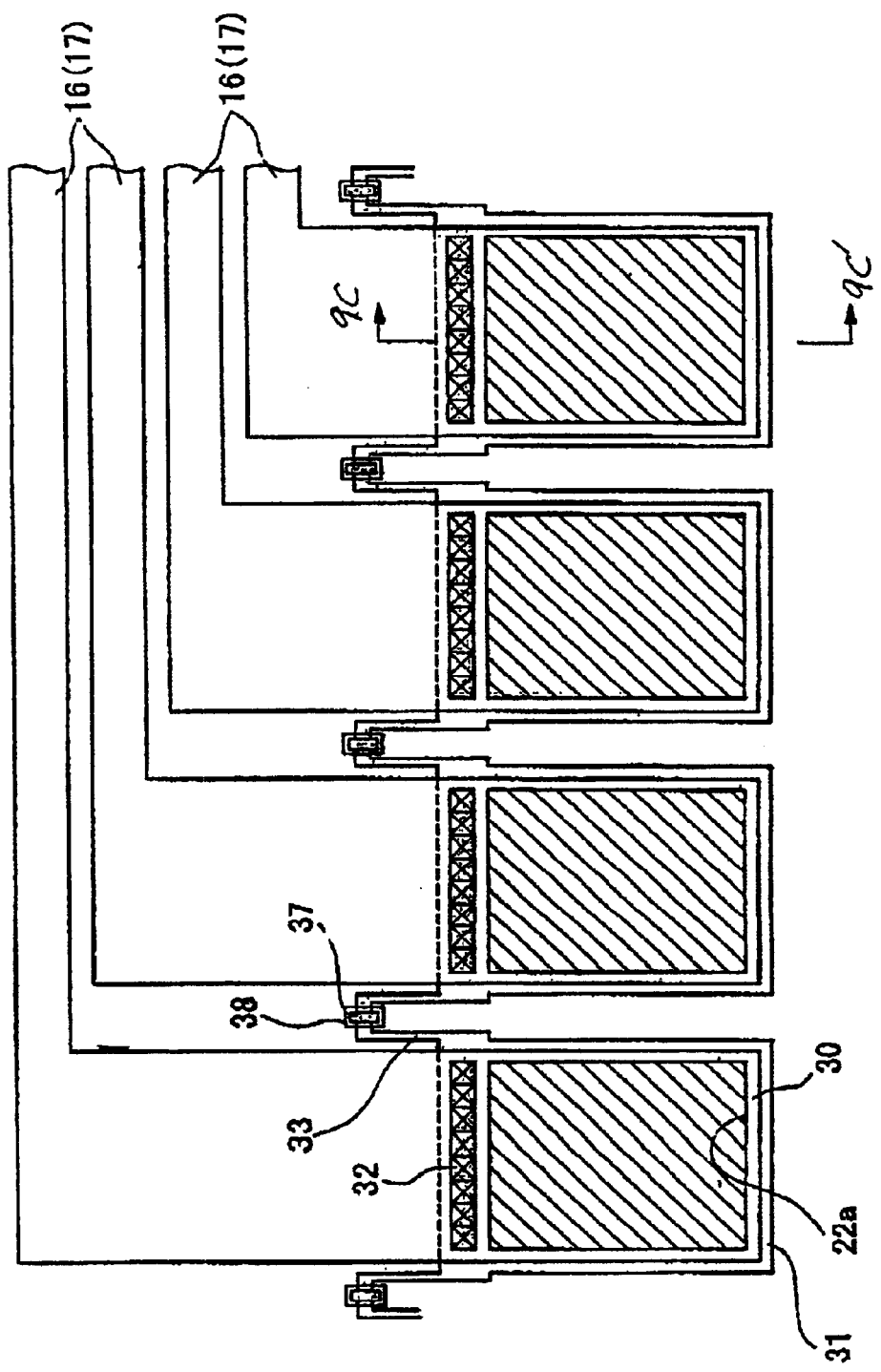
FIG. 5 is a plan view showing the terminal area of the active matrix substrate of FIG. 2.

FIG. 4 is a plan view showing the connection structure of the active matrix substrate 7, and FIG. 5 is a plan view showing the terminal area of the active matrix substrate 7. As shown in FIG. 5 and FIGS. 25(A)–(C), each of terminals 30 (corresponding to the terminals 13, 14 and 15 shown in FIG. 2) may include a pad exposed from an aperture 22a of the second interlayer insulating film 22, and can be connected to an external terminal. The terminals 30 are formed on the first interlayer insulating film 21. On the other hand, short-circuit wiring, which will be described below, is formed in the layer below the first interlayer insulating film 21 at the same time as the scanning lines 4. Therefore, terminal under sheet films 31 which partly constitute the short-circuit wiring 33 are electrically connected to the terminals 30 through contact holes 32 formed in the first interlayer insulating film 21.

In the active matrix substrate 7 having the above construction, the TFTs 2, various types of wiring, the scanning line driving circuits 11, and the data line driving circuit 10 are formed by using the semiconductor manufacturing process. Since the active matrix substrate 7 may include the insulating substrate 12, troubles due to static electricity or the like easily occurs, and in this embodiment, the following measure against static, electricity is taken.

First, in this embodiment, as shown in FIG. 2, first short-circuit wiring 41 electrically connected to all signal wiring 16 and 17 is formed by using the step of forming the scanning lines 4 and the gate electrodes 20 of the TFTs 2. Also, second short-circuit wiring 42 electrically connected to all scanning lines 4 is formed by using the step of forming the scanning lines 4 and the gate electrodes 20 of the TFTs 2. Furthermore., third short-circuit wiring 43 electrically connected to all data lines 3 is formed by using the step of forming the scanning lines 4 and the gate electrodes 20 of the TFTs 2. The first, second and third short-circuit wiring 41, 42 and 43 are made of a polycrystalline silicon film patterned together with the scanning lines 4, and the gate electrodes 20 of the TFTs 2. Therefore, the first and third short-circuit wiring 41 and 43 are located in different layers from the signal wiring 16 and 17 and the data lines 3, respectively, and thus the first and third short-circuit wiring 41 and 43 are electrically connected to the signal wiring 16 and 17 and the data lines 3, respectively, through contact holes 34 formed in the first interlayer insulating film 21. See FIG. 4.

In this way, the first, second and third short-circuit wiring 41, 42 and 43 are connected to the signal wiring 16 and 17, the scanning lines 4 and the data lines 3, respectively. Even when static electricity occurs in the step performed after the formation of the wiring structure, the electric charge diffuses to the peripheral side of the substrate through the first, second and third short-circuit wiring 41, 42, and 43 to prevent a sudden flow of an excessive current through the scanning lines 4, the pixel region 9, the scanning line driving circuits 11, the data line driving circuit 10, etc., thereby protecting these portions from static electricity.

Figure 6:
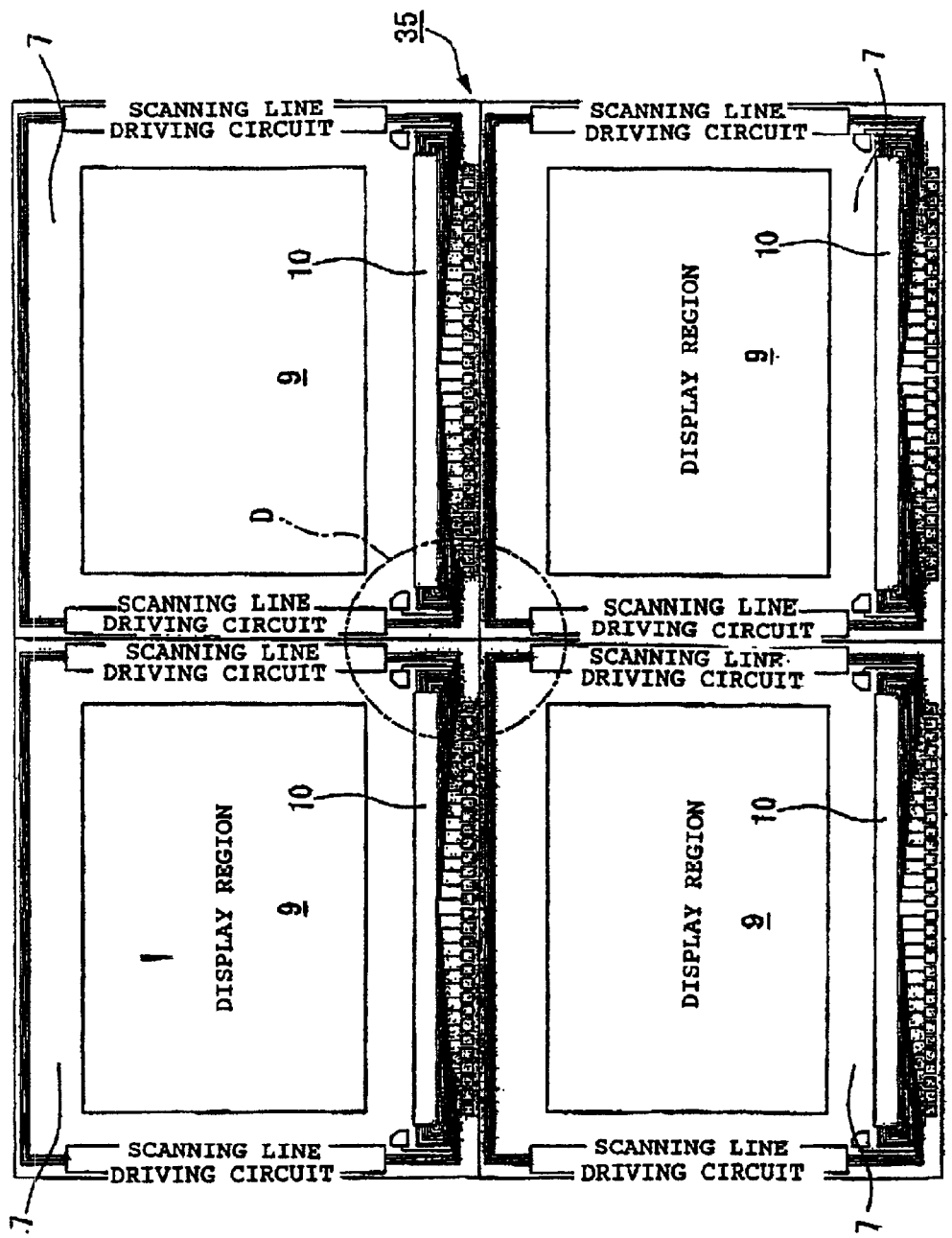
FIG. 6 is a plan view showing a state in which the active matrix substrates of FIG. 2 are arranged on a motherboard.
Figure 7:
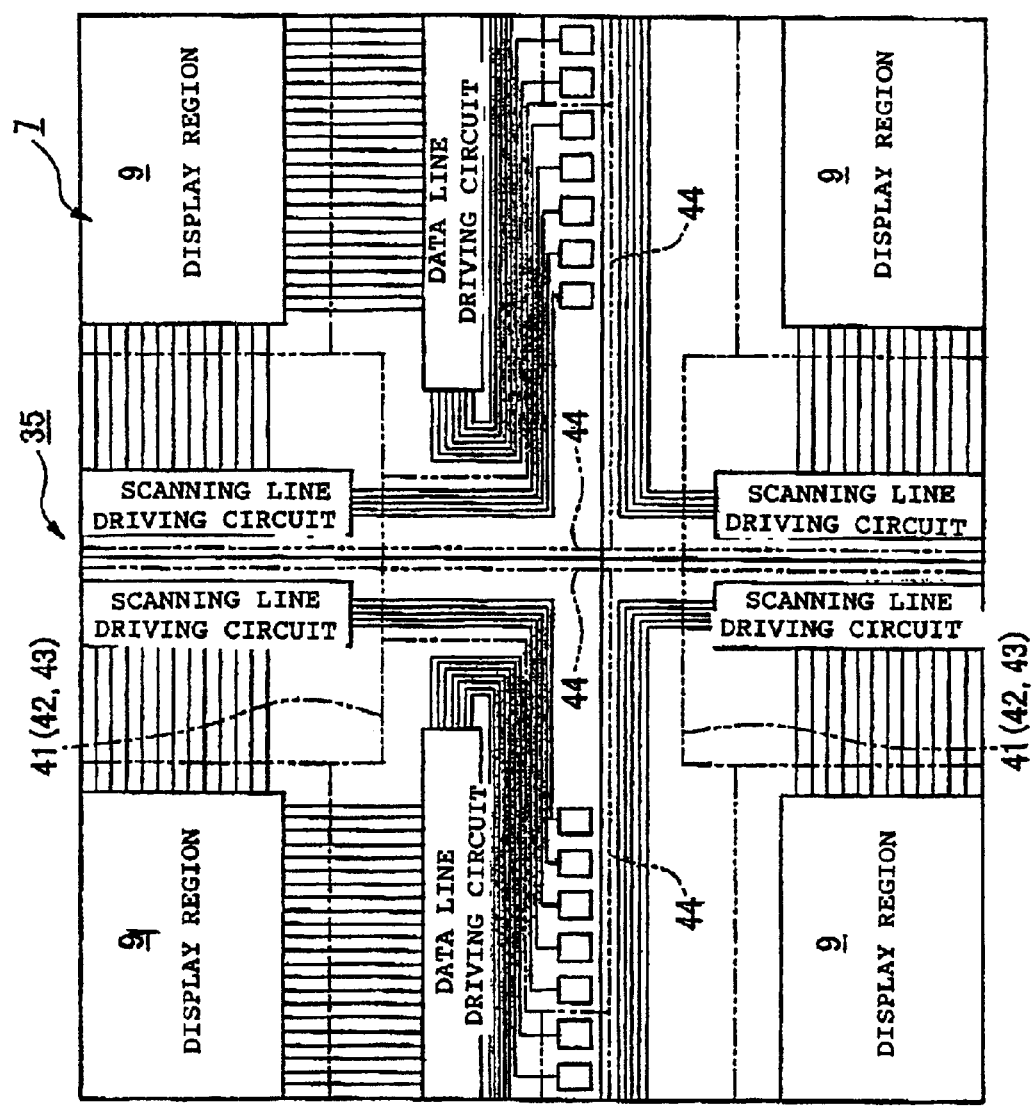
FIG. 7 is an enlarged plan view showing the region D of the motherboard shown in FIG. 6.

As shown in FIG. 6, a plurality (in this example, four) of active matrix substrates 7 are formed on a mother board 35, and each of the active matrix substrate 7 is cut off from the mother board 35 in some cases. As shown in FIG. 7 which is an enlarged view of the region D shown in FIG. 6, in this case, electrostatic measure wiring 44 electrically connected to the first, second and third short-circuit wiring 41, 42 and 43 is provided on the peripheral side of each of the active matrix substrates 7 to diffuse electrostatic charge to the periphery of each substrate. In this case, the electrostatic measure wiring 44 electrically connected to the first, second and third short-circuit wiring 41, 42 and 43 are connected to each other between the adjacent active matrix substrates 7 up to the final step, and separated between the active matrix substrates 7 during cutting of the mother board 35. In this construction, the electrostatic measure wiring 44 are distributed over a wide range to prevent concentration of charge, further improving the effect.

However, the first, second and third short-circuit wiring 41, 42 and 43 are unnecessary after the completion of the process of manufacturing the active matrix substrate 7. Since the short-circuit wiring interfere with the subsequent step of inspecting electric properties, the cutting holes 37 are formed in the first interlayer insulating film 21 and the second interlayer insulating film 22 at the positions marked with x in FIG. 2 by utilizing an intermediate step, and the short-circuit wiring 33 (the first, second and third short-circuit wiring 41, 42 and 43) is cut by etching through the cutting holes 37, as described below with reference to FIGS. 9(A)–(C) to FIGS. 25(A)–(C). Therefore, while the first, second and third short-circuit wiring 41, 42 and 43 are connected to the signal lines 16 and 17, the scanning lines 4, and the data lines 3, respectively, up to an intermediate step of the manufacturing process, the signal wiring 16 and 117, the scanning lines 4, and the data lines 3 are electrically separated after etching through the cutting holes 37. This permits the inspection of the electric properties in a state before the active matrix substrates 7 of the mother board 35 are separated from each other.

Therefore, in the first, second and third short-circuit wiring 41, 42 and 43 shown in FIGS. 3 to 5, the rectangular holes (the shape of the holes passing through the first interlayer insulating film 21 and the second interlayer insulating film 22) denoted by reference numeral 37 are provided in the course of the wiring. Also, the etching stop layer 38 having a shape larger than the shape of the cutting holes 37 is provided below each of the cutting holes 37 as if a cushion is put below each cutting hole, which is the most characteristic of the present invention. In this embodiment, each of the etching stop layers 38 may include the same single crystal silicon film as the semiconductor active films 27 of the TFTs 2, and has sufficiently high selectivity to etching of a silicon oxide film system.

Figure 8:
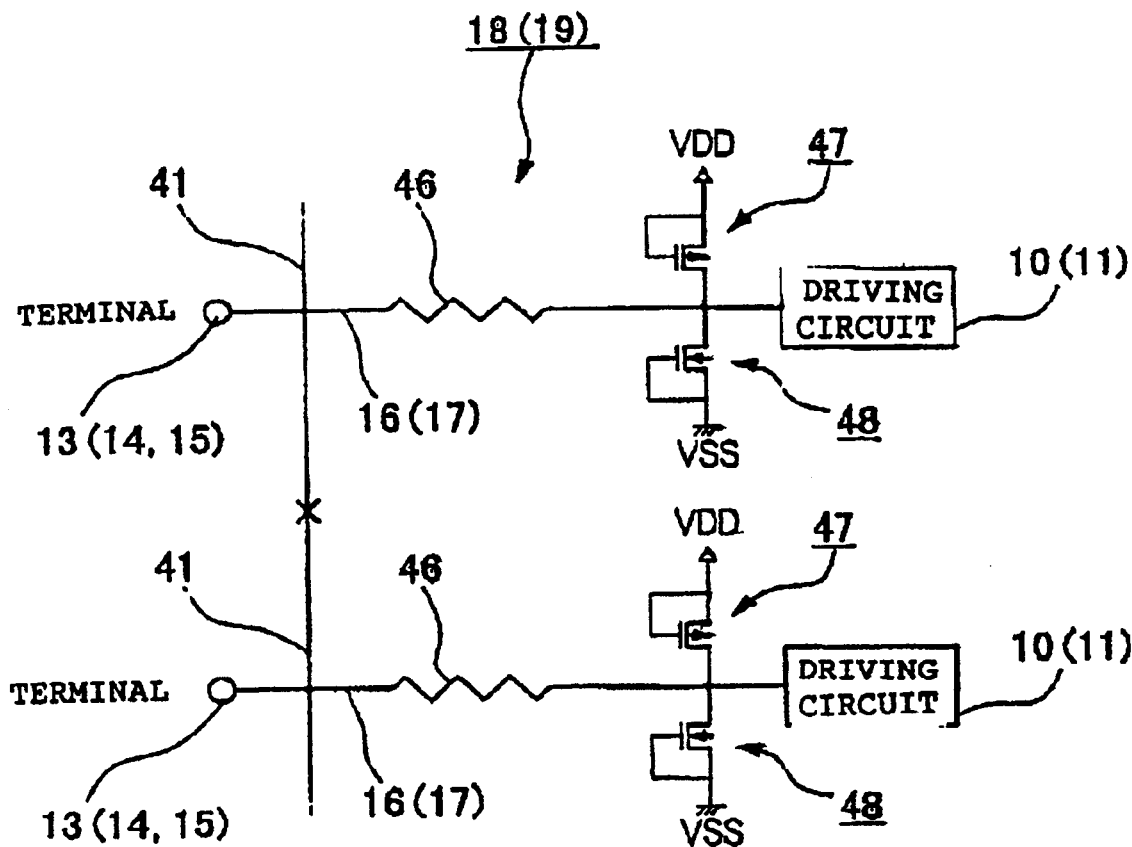
FIG. 8 is a drawing showing the electrostatic protection circuits formed on the active matrix substrate of FIG. 2.

As the electrostatic protection circuits 18 and 19 shown in FIG. 2, various circuits can be used. For example, as shown in FIG. 8, a circuit including a protective resistor 46, P-channel TFT 47 and N-channel TFT 48, which are provided in a push-pull arrangement, can be used, in which a diode is formed between a positive power source VDD and a negative power source VSS. In this embodiment, the first short-circuit wiring 41 is necessarily connected to the signal wiring 16 (or 17) between the terminals 13 (or 14 or 15) and the protective resistors 46. In this construction, static electricity entering from the terminals 13 (or 14 or 15) or the first short-circuit wiring 41 does not reach the data line driving circuit 10 and the scanning line driving circuits 11 unless it passes through the protective resistors 46 and the electrostatic protection circuits 18 (or 19). This construction enables the static electricity to be securely absorbed by the electrostatic protection circuits 18 (or 19) to securely protect the data line driving circuit 10 and the scanning line driving circuits 11.

Method of Manufacturing Active Matrix Substrate

The method of manufacturing the active matrix substrate 7 while providing a measure against static electricity will be described with reference to FIGS. 9(A)–(C) to FIGS. 25(A)–(C). These figures are sectional views showing the steps of the method of manufacturing the active matrix substrate 7 of this embodiment. FIGS. 9(A)–25(A) are sectional views (sectional views of the pixel TFT area) taken along line 9A-9A' of FIG. 3. FIGS. 9(B)–25(B) are sectional views (sectional views of the electrostatic measure wiring area including the holes for cutting the short-circuit wiring (marked with x in FIG. 2)) taken along line 9B-9B' of FIG. 4. FIGS. 9(C)–25(C) are sectional views (sectional views of the terminal area where the terminals 13, 14 and 15 are formed) taken along line 9C-9C' of FIG. 5.

First, as shown in FIGS. 9(A)–(C), a single crystal silicon substrate, which may include a silicon oxide film 62 formed on the surface thereof by thermal oxidation or the like, and a quartz substrate 63 are bonded by heat treatment with the silicon oxide film adhering to the quartz substrate. A single crystal silicon layer 61 is formed thereon by etching or the like to prepare a bonding SOQ substrate. Therefore, the interface between the buried oxide film 62 (silicon oxide film or a base oxide film) and the quartz substrate 63 is the bonding interface. The thickness of the buried oxide film 62 is, for example, about 400 nm, and the thickness of the single crystal silicon layer 61 is, for example, about 100 nm.

Next, as shown in FIGS. 10(A)–(C), the single crystal silicon layer 61 is patterned by the photolithography technique to form the island-like semiconductor active layers 27 on the pixel TFT area side. While on the electrostatic measure wiring area side, the etching stop layers 38 having a shape larger than cutting holes 37 are formed at the positions corresponding to the cutting holes 37 which will be formed later. On the terminal area side, the single crystal silicon layer 61 is completely removed.

Next, as shown in FIGS. 11(A)–(C), gate oxide films 65 which may include a silicon oxide film having a thickness of about 50 nm to about 150 nm are formed on the surfaces of the semiconductor active layers 27 by thermal oxidation or the like. Alternatively, a thermal oxidation film may be formed to about 5 nm to about 100 nm, preferably 30 nm, and then a silicon oxide film may be deposited to about 10 nm to 100 nm, preferably 50 nm, over the entire surface by CVD or the like to form the gate oxide films 65 including these two silicon oxide layers. In order to impart higher voltage resistance to the gate oxide films 65, a silicon nitride film may be used. In any case, the silicon oxide films are formed on the surfaces of the etching stop layers 38 at the same time as the surfaces of the semiconductor active layers 27.

Next, as shown in FIGS. 12(A)–(C), a polycrystalline silicon film 66 for forming gate electrodes 20 is formed over the entire surface of the substrate, and then phosphorus is diffused into the polycrystalline silicon film 66 to make it conductive. Alternatively, a doped silicon film doped with phosphorus may be used at the same time as deposition of the polycrystalline silicon film 66.

Next, as shown in FIGS. 13(A)–(C), the polycrystalline silicon film 66 is patterned by the photolithography technique to form the gate electrodes 20 on the pixel TFT area side. On the other hand, on the electrostatic measure wiring area side, the polycrystalline silicon films 66 are left as the short-circuit wiring 33 (corresponding to the first, second and third short-circuit wiring 41, 42 and 43). The short-circuit wiring 33 is formed to cross the etching stop layers 38. On the terminal area side, the polycrystalline silicon film 66 is left as the terminal under sheet films 31.

Next, as shown in FIGS. 14(A)–(C), on the pixel TFT area side and the N-channel TFT area side of the driving circuits (not shown), a low concentration of impurity ion 67 (phosphorus ion) is implanted in a dose of about $0.1 \times 10^{13}/cm^2$ to about $10 \times 10^{13}/cm^2$ using the gate electrodes 20 as a mask to form the low-concentration source regions 25a and the low-concentration drain regions 26a on the pixel TFT area side in a self-alignment manner for the gate electrodes 20. In this step, the portions directly below the gate electrodes 20, in which the impurity ion 67 is not implanted, serve as channel regions 68 including the semiconductor active films 27. In this embodiment, the electrostatic measure wiring area and the terminal area are covered with a resist mask 69 so as to prevent the impurity ion from being implanted into the etching stop layers 38 and the terminal under sheet films 31. However, means using no resist mask does not interfere with the achievement of the object of the present invention.

Next, as shown in FIGS. 15(A)–(C), in the pixel TFT area, a resist mask 70 wider than the gate electrodes 20 is formed, and a high concentration of impurity ion 71 (phosphorus ion) is implanted in a dose of about $0.1 \times 10^{15}/cm^2$ to about $10 \times 10^{15}/cm^2$ to form the high-concentration source regions 25b and the high-concentration drain regions 26b. Like in the previous step, the electrostatic measure wiring area and the terminal area may be covered with the resist mask 70 or not.

Instead of theses steps of implanting impurities, a high concentration of impurity ion (phosphorus ion) may be implanted with a resist mask wider than the gate electrodes 20 formed to form the off-set structure source regions and drain regions without implantation of a low concentration of impurity. Of course, a high concentration of impurity ion (phosphorus ion) may be implanted into the gate electrodes 20 to form self-alignment structure source and drain regions.

Although not shown in the drawings, in order to form the P-channel TFT area of a peripheral driving circuit, the pixel region 9 and the N-channel TFT area are protected by coating a resist mask, and boron ions are implanted in a dose of about $0.1 \times 10^{15}/cm^2$ to about $10 \times 10^{15}/cm^2$ using the gate electrodes 20 as a mask to form the self-alignment P-channel source and drain regions. Like in the formation of the N-channel TFT area, a low concentration of impurity (boron ion) may be implanted in a dose of about $0.1 \times 10^{13}/cm^2$ to about $10 \times 10^{13}/cm^2$ using the gate electrodes as a mask to form low-concentration regions in the single crystal silicon film, and then a high concentration of impurity (boron ion) may be implanted in a dose of about $0.1 \times 10^{15}/cm^2$ to about $10 \times 10^{15}/cm^2$ using a mask wider than the gate electrodes to form LDD (Lightly Doped Drain) structure source and drain regions. Alternatively, a high concentration of impurity (boron ion) is implanted with a mask wider than the gate electrodes 20 formed to form offset structure source and drain regions without the implantation of low concentration of impurity. These ion implantation steps permit the formation of CMOS transistors, and the peripheral driving circuits to be built in the same substrate.

Next, as shown in FIGS. 16(A)–(C), the first interlayer insulating film 21 which may include a NSG film (a silicate glass film not containing boron or phosphorus) having a thickness of about 500 nm to about 1500 nm is formed on the surfaces of the gate electrodes 20, the short-circuit wiring 33 and the terminal under sheet films 31 by the CVD process at, for example, about 800° C.

Next, as shown in FIGS. 17(A)–(C), on the pixel TFT area side, the source contact holes 23 are formed by the photolithography technique in the portions of the first interlayer insulating film 21 which correspond to the source regions 25b, and on the terminal area side, the contact holes 32 are formed in the portions of the first interlayer insulating film 21 which correspond to the terminal under sheet films 31.

Next, as shown in FIGS. 18(A)–(C), an aluminum film 72 is formed on the surface side of the first interlayer insulating film 21 by sputtering for forming the source electrodes, the signal wiring, the terminals, etc. In this step, a metal silicide film or a metal alloy film may be used instead of the metal film of aluminum or the like.

Then, as shown in FIGS. 19(A)–(C), the aluminum film 72 is patterned by the photolithography technique to form the source electrodes 73, which partially constitute the data lines 3, in the pixel TFT area. At the same time, in the electrostatic measure wiring area, signal wiring 74 (the signal wiring 16 and 17), and on the terminal area side, the terminals 30 (terminals 13, 14 and 15) are formed.

By using the steps shown in FIGS. 17(A)–(C) to FIGS. 19(A)–(C), the first and third short-circuit wiring 41 and 43 are connected to the signal wiring 16 and 17 and the data lines 3, respectively.

Next, as shown in FIGS. 20(A)–(C), the second interlayer insulating film 22 which may include at least two layers including a BPSG film (a silicate glass film containing boron and phosphorus) having a thickness of about 50 nm to about 1500 nm and a NSG film of about 10 nm to about 30 nm is formed on the surface side of the source electrodes 73, the signal wiring 74 and the terminals 30 by the CVD process at a temperature of, for example, about 400° C.

Next, as shown in FIGS. 21(A)–(C), on the pixel TFT area side, the drain contact holes 24 are formed by the photolithography technique and dry etching method in the portions of the first interlayer insulating film 21 and the second interlayer insulating film 22, which correspond to the drain regions 26b of the TFTs 2. At the same time, on the electrostatic measure wiring area side, the cutting holes 37 are formed above the short-circuit wiring 33 (corresponding the first, second and third short-circuit wiring 41, 42 and 43). In this step, the short-circuit wiring 33 is exposed to the outside in the cutting holes 37.

Next, as shown in FIGS. 22(A)–(C), an ITO film 75 having a thickness of about 40 nm to about 200 nm is formed on the surface side of the second interlayer insulating film 22 by the sputtering method, for subsequently forming the pixel electrodes 1. Then, as shown in FIGS. 23(A)–(C), the ITO film 75 is patterned by the photolithography technique to form the pixel electrodes 1 of the pixel TFT area. On the other hand, in the electrostatic measure wiring area and the terminal area, the ITO film 75 is completely removed. The material for the pixel electrodes 1 is not limited to the ITO film, and transparent electrode materials composed of high-melting-point metal oxides or the like, such as an SnOx film, a ZnOx film, and the like, can also be used. By using these materials, step coverage in the contact holes has resistance to practical use.

Next, as shown in FIGS. 24(A)–(C), a resist mask 76 having apertures formed in the regions of the terminal area, in which the terminals 30 are exposed, is formed on the surface side of the second interlayer insulating film 22. Although the resist mask 76 is basically used for exposing the terminals 30, the resist mask 76 is also used for cutting the short-circuit wiring 33, and thus apertures are also provided in the portions corresponding to the cutting holes 37 on the electrostatic measure wiring area side.

Then, as shown in FIGS. 25(A)–(C), the second interlayer insulating film 22 is wet-etched through the resist mask 76 to expose the terminals 30 from the apertures 22a in the terminal area. Until this step, i.e., during the time from the step of exposing the short-circuit wiring 33 from the cutting holes 37 to the step of depositing the ITO film 75 and etching it, a native oxide film (silicon oxide film) is formed on the surface of the short-circuit wiring 33 including a polycrystalline silicon film. However, the surface of the short-circuit wiring 33 is also exposed to the etchant used for wet etching the second interlayer insulating film 22, and thus the native oxide film is also etched to expose the polycrystalline silicon film from the surface of the short-circuit wiring 33. Therefore, the polycrystalline silicon film is securely etched in the subsequent step of cutting the short-circuit wiring 33 to securely cut the short-circuit wiring 33.

Furthermore, on the electrostatic measure wiring area side, the short-circuit wiring 33 exposed from the cutting holes 73 is etched by dry etching or the like to cut the short-circuit wiring 33 at the exposed positions. As a result, the data lines 3, the scanning lines 4 and the signal wiring 74 (16 and 17) are electrically separated. Particularly, in this embodiment, the short-circuit wiring 33 (the first, second and third short-circuit wiring 41, 42 and 43) is cut in the final step of the manufacturing process, and thus the short-circuit wiring 33 effectively functions against the static electricity produced in the many previous steps. In cutting the short-circuit wiring 33, the etching stop layers 38 including a single crystal silicon film and provided below the short-circuit wiring 33 are also etched at the same time as etching of the short-circuit wiring 33 including a polycrystalline silicon film to bring about a state in which the etching stop layers 38 are removed from the cutting holes 37 to leave only the peripheral ring portions of the etching stop layers 38 after cutting the short-circuit wiring 33. Even in such cases, however, the etching stop layers 38 have already done the function, and there is thus no hindrance.

Advantage of this Embodiment

As described above, in this embodiment, each of the steps is performed in the state wherein the signal wiring 74 (16 or 17) extended from the plurality of terminals 30 (13, 14, and 15) to each of the data line driving circuit 10 and the scanning line driving circuits 11 is electrically connected to the first short-circuit wiring 41. Therefore, even when static electricity occurs, or charge is accumulated on the surface of the insulating substrate during the manufacturing process, such a charge diffuses to the peripheral side of the substrate through the first short-circuit wiring 41, thereby preventing a sudden flow of an excessive current to the data line driving circuit 10 and the scanning line driving circuits 11. As a result, the data line driving circuit 10 and the scanning line driving circuits 11 can be protected. In addition, by using the step of forming the TFTs 2, the step of forming various types of wiring, and the step of forming the contact holes in the step of the terminals 30, the patterning step, the etching step, or the like, the first short-circuit wiring 41 and the cutting holes 37 can be formed, and the first short-circuit wiring 41 can be cut using the cutting holes 37. Therefore, the manufacturing process is not complicated, as compared with cases without a measure against static electricity.

Similarly, a sudden flow of an excessive current to the scanning lines 4 can be prevented by using the second short-circuit wiring 42 electrically connected to each of the scanning lines 4, thereby protecting the scanning lines 4 and the pixel region 9. Furthermore, a sudden flow of an excessive current to the data lines 3 can be prevented by using the third short-circuit wiring 43 electrically connected to each of the data lines 3, thereby protecting the data lines 3 and the pixel region 9.

Although the effects of the short-circuit wiring provided as a measure against static electricity are described above, this embodiment exhibits a significant effect in cutting the short-circuit wiring 33 when the etching stop layers 38 are provided below the short-circuit wiring 33. Namely, in the structure of the cutting portions of conventional short-circuit wiring, as shown in FIG. 26(A), the short-circuit wiring is formed directly on the buried oxide film, and thus etching excessively proceeds at the interface between the substrate and the buried oxide film in etching the second interlayer insulating film for exposing the terminals, thereby causing cracking and peeling of the insulating film.

On the other hand, in the structure of this embodiment, as shown in FIG. 26(B), the etching stop layer 38 is interposed between the short-circuit wiring 33 and the buried oxide film 62. Since the etching stop layer 38 includes a single crystal silicon film and thus has sufficient resistance to etching of the second interlayer insulating film 22 (a laminated film including the BPSG film and the NSG film), etching is stopped in the etching stop layer 38 to prevent etching of the bonding interface between the buried oxide film 62 and the substrate 63. As a result, in this embodiment, it is possible to securely prevent the occurrence of cracking and peeling of the insulating film accompanying the step of cutting the short-circuit wiring 33. It is consequently possible to realize a liquid crystal device having less display defect due to electrostatic damage or the like, high image quality and high reliability.

Furthermore, the silicon oxide film 65 which constitutes each of the gate oxide films is formed on the surface of each of the etching stop layers 38, and etching actually transversely proceeds along the silicon oxide films 65 after the etchant reaches the surfaces of the etching stop layers 38. Strictly, as far as FIG. 26(B) is concerned, etching seems to proceed to the buried oxide film 62 through the silicon oxide films 65 with an increase in the amount of over-etching. However, in fact, the transverse dimension is significantly larger than the thickness dimension, and the dimension of the peripheral portions of the etching stop layers 38, which extend outward from the cutting holes 37, can be appropriately set so that etching can easily be prevented from reaching the buried oxide film 62.

In this embodiment, the etching stop layers 38 may include the single crystal silicon film in the same layer as the semiconductor active films 27 of the TFTs 2, and the etching stop layers 38 are patterned by using the step of forming the semiconductor active films 27 of the TFTs 2. Therefore, a new step need not be added for forming the etching stop layers 38, and from this viewpoint, the manufacturing process is not complicated.

Second Embodiment

Figure 27:
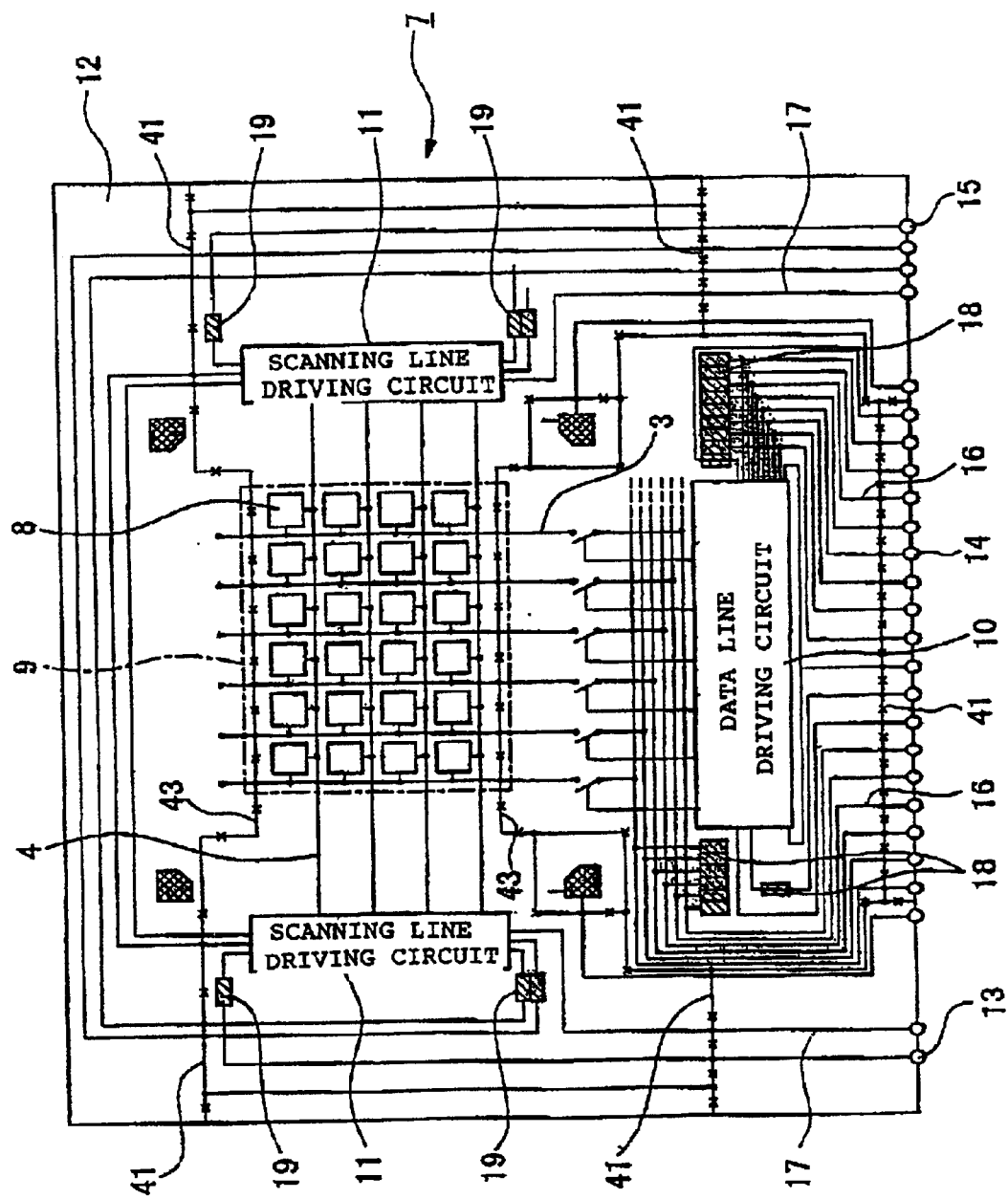
FIG. 27 is a block diagram schematically showing the construction of an active matrix substrate which constitutes a liquid crystal device according to a second exemplary embodiment of the present invention.
Figure 28:
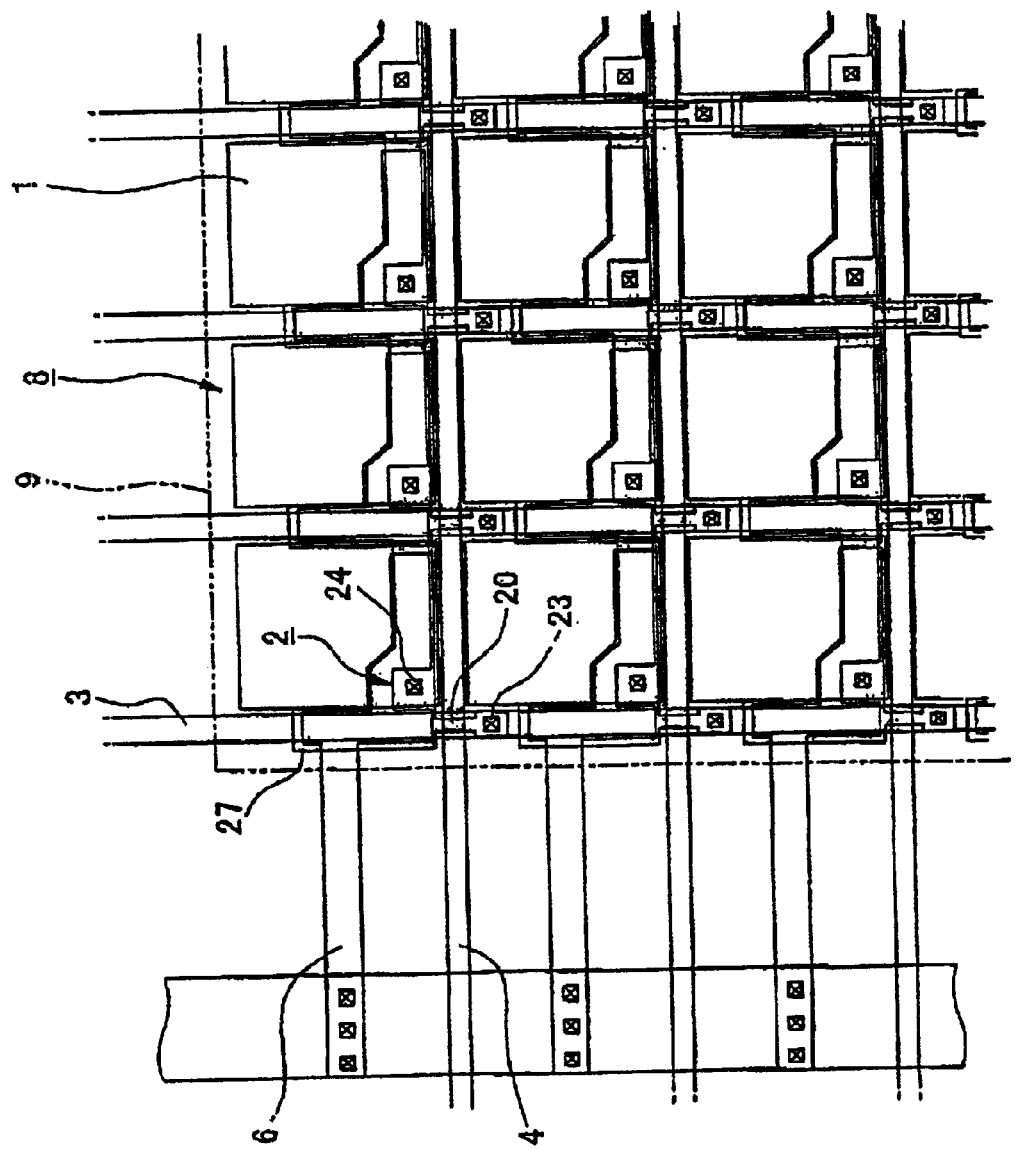
FIG. 28 is an enlarged plan view showing the corner of the pixel region of the active matrix substrate of FIG. 27.

A liquid crystal device in accordance with a second exemplary embodiment of the present invention will be described below with reference to FIGS. 27 and 28.

In the first embodiment shown in FIG. 2, the first, second and third short-circuit wiring 41, 42 and 43 are connected to the signal wiring 16 and 17, the scanning lines 4 and the data lines 3, respectively, and these wiring are separated after the completion of the process for manufacturing the active matrix substrate 7. However, in this embodiment, as shown in FIGS. 27 and 28, the first short-circuit wiring 41 is formed only for the signal wiring 16 and 17 located on the terminal 30 (13, 14, 15) side of the electrostatic protection circuits 18 and 19 among a plurality of signal wiring extended from the plurality of terminals 30 (13, 14, and 15) for supplying a plurality of signals for driving the data line driving circuit 10 and the scanning line driving circuits 11. Also, the third short-circuit wiring 43 is formed for the data lines 3. Since the other construction and the manufacturing method are the same as the first embodiment except that the second short-circuit wiring 42 is not formed, the same components as the first embodiment are denoted by the same reference numerals in FIGS. 27 and 28, and description thereof is omitted.

Even in this construction, static electricity produced, and charge accumulated on the surface of the insulating substrate 12 can be diffused to the peripheral side of the substrate through the first and third short-circuit wiring 41 and 43, thereby preventing a sudden flow of an excessive current to the data line driving circuit 10 and the scanning line driving circuits 11. Therefore, the data line driving circuit 10 and the scanning line driving circuits 11 can be protected.

Third Embodiment

Figure 29:
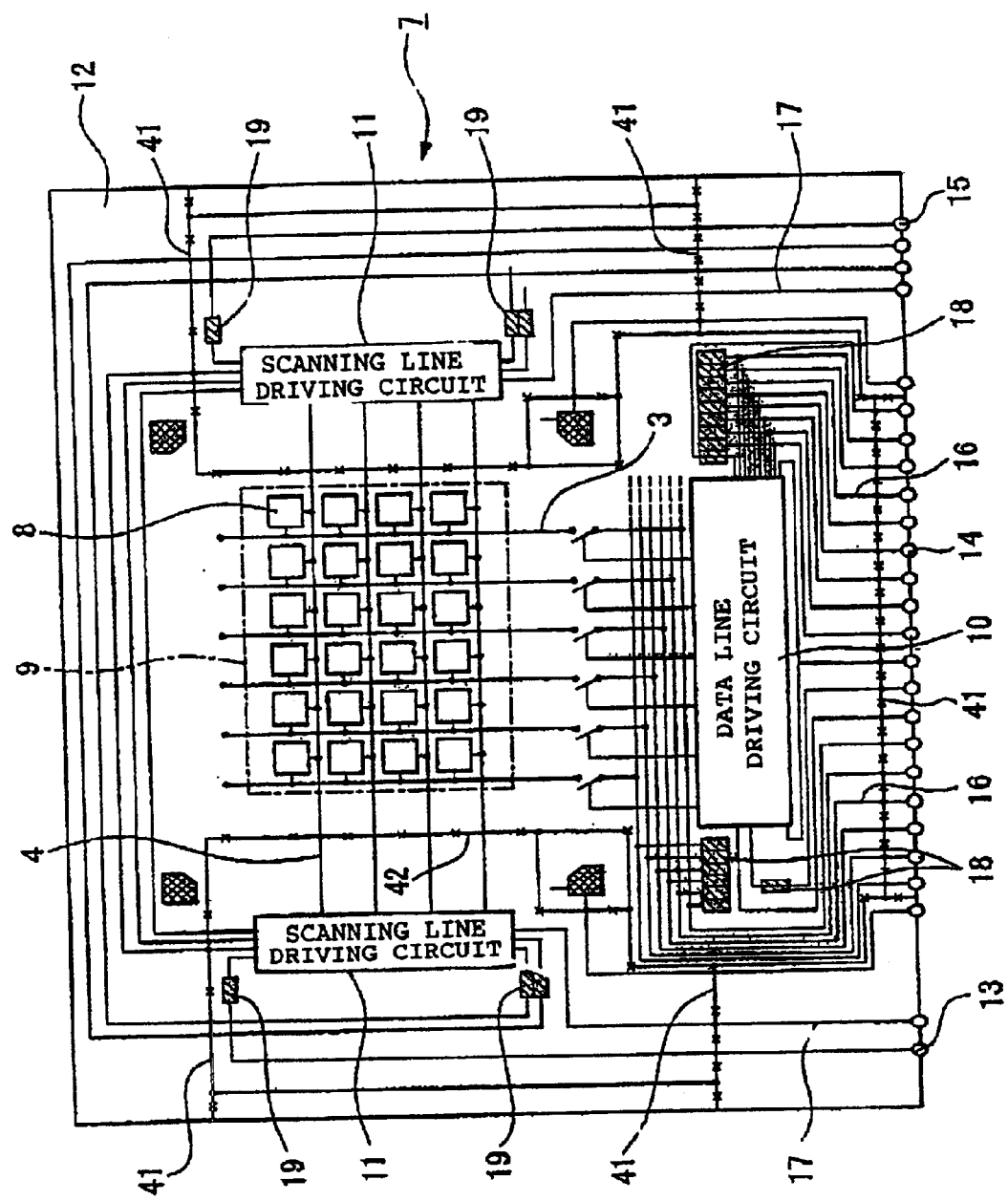
FIG. 29 is a block diagram schematically showing the construction of an active matrix substrate which constitutes a liquid crystal device according to a third exemplary embodiment of the present invention.
Figure 36:
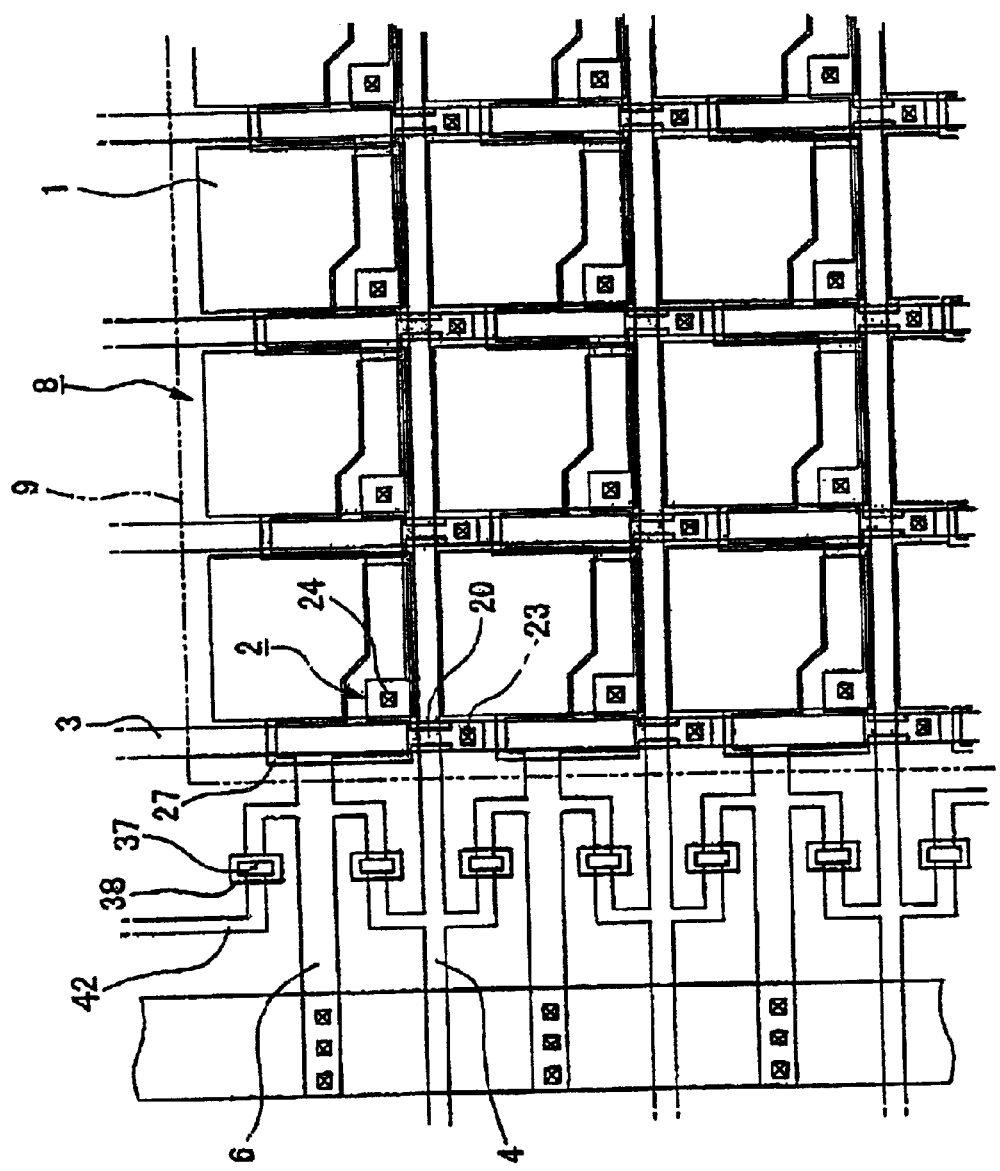
FIG. 36 is a plan view of the terminal area of the active matrix substrate of FIG. 34.

A liquid crystal device in accordance with a third exemplary embodiment of the present invention will be described below with reference to FIGS. 29 and 30.

In the first embodiment shown in FIG. 2, the first, second and third short-circuit wiring 41, 42 and 43 are connected to the signal wiring 16 and 17, the scanning lines 4 and the data lines 3, respectively, and these wiring are separated after the completion of the process for manufacturing the active matrix substrate 7. However, in this embodiment, as shown in FIGS. 29 and 30, the first short-circuit wiring 41 is formed for the signal wiring 16 and 17 extended from the plurality of terminals 13, 14, and 15 to the data line driving circuit 10 and the scanning line driving circuits 11. Also, the second short-circuit wiring 42 is formed for the scanning lines 4. Since the other construction and the manufacturing method are the same as the first embodiment except that the third short-circuit wiring 43 is not formed, the same components as the first embodiment are denoted by the same reference numerals in FIGS. 29 and 30, and description thereof is omitted.

Even in this construction, static electricity produced, and charge accumulated on the surface of the insulating substrate can be diffused to the peripheral side of the substrate through the first and second short-circuit wiring 41 and 42, thereby preventing a sudden flow of an excessive current into the data line driving circuit 10 and the scanning line driving circuits 11. Therefore, the data line driving circuit 10, the scanning line driving circuits 11, and the scanning lines 4 can be protected.

Whole Construction of Liquid Crystal Device

Figure 31A:
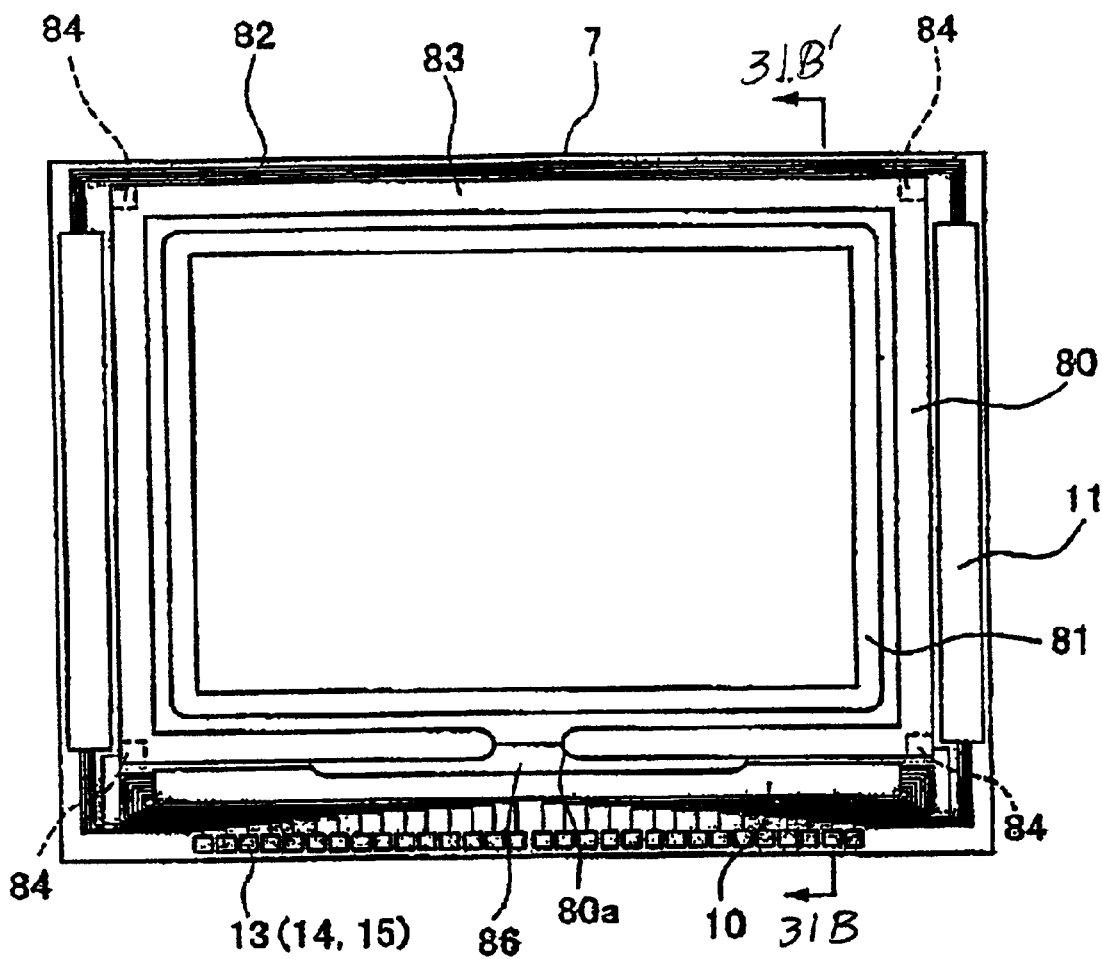

The whole construction of a liquid crystal device will be described with reference to FIGS. 31(A)–(B). FIG. 31(A) is a plan view of the active matrix substrate together with the components formed thereon, as viewed from the counter substrate side, and FIG. 31(B) is a sectional view of the construction including the counter substrate taken along line 31B-31B' of FIG. 31(A).

Figure 31B:
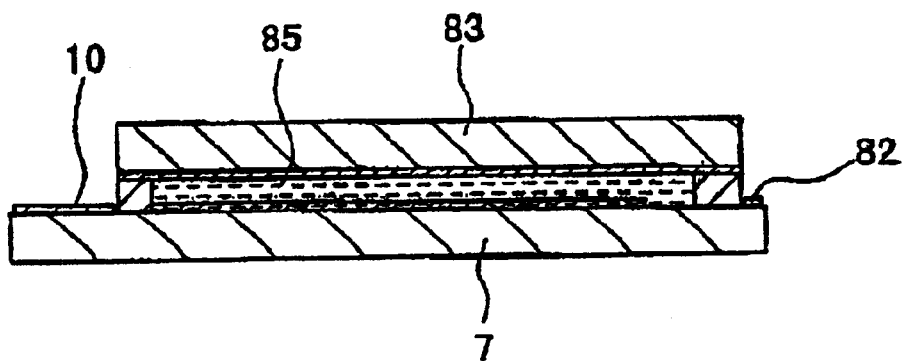

As shown in FIGS. 31(A)–(B), a sealing material 80 is provided edgewise on the active matrix substrate 7 of each of the above embodiments, and a light shielding film 81 is provided as a frame in parallel with the inside of the sealing material 80. The data line driving circuit 10, and the terminals 13, 14 and 15 are provided along one side of the active matrix substrate 7 in the region outside the sealing material 80, and the scanning line driving circuits 11 are provided long the two sides adjacent to the one side. Of course, the scanning line driving circuit 11 may be provided on only one side when a delay of the scanning signal supplied to the scanning lines 4 is not a problem. Also, the data line driving circuit 10 may be provided on both sides along the sides of the image display region. For example, one data line driving circuit may be provided along one side of the image display region to supply image signals to the odd-number data lines 3, and another data line driving circuit may be provided on the other side of the image display region to supply image signals to the even-number data lines 3. In this way, the data lines 3 are driven in a comb like manner so that the area occupied by the data line diving circuits can be extended to permit the construction of a complicated circuit. Furthermore, a plurality of wiring 82 are provided on the remaining side of the active matrix substrate 7, for connecting the scanning line driving circuits 11 provided on both sides of the image display region. Furthermore, a conductive material 84 is provided at at least one corner of the counter substrate 83, for electrically connecting the TFT array substrate 7 and the counter substrate 83. The counter substrate 83 having substantially the same outline as the sealing material 80 is secured to the active matrix substrate 7 with the sealing material 80. The liquid crystal 85 between the TFT array substrate 7 and the counter substrate 83 is sealed with a sealant 86 provided at the aperture 80a of the sealing material 80.

Example of Application of Liquid Crystal Device

An example in which the liquid crystal device of each of the embodiments is used as a transmissive display for an electronic apparatus will be described with reference to FIGS. 32 and 33.

Figure 32:
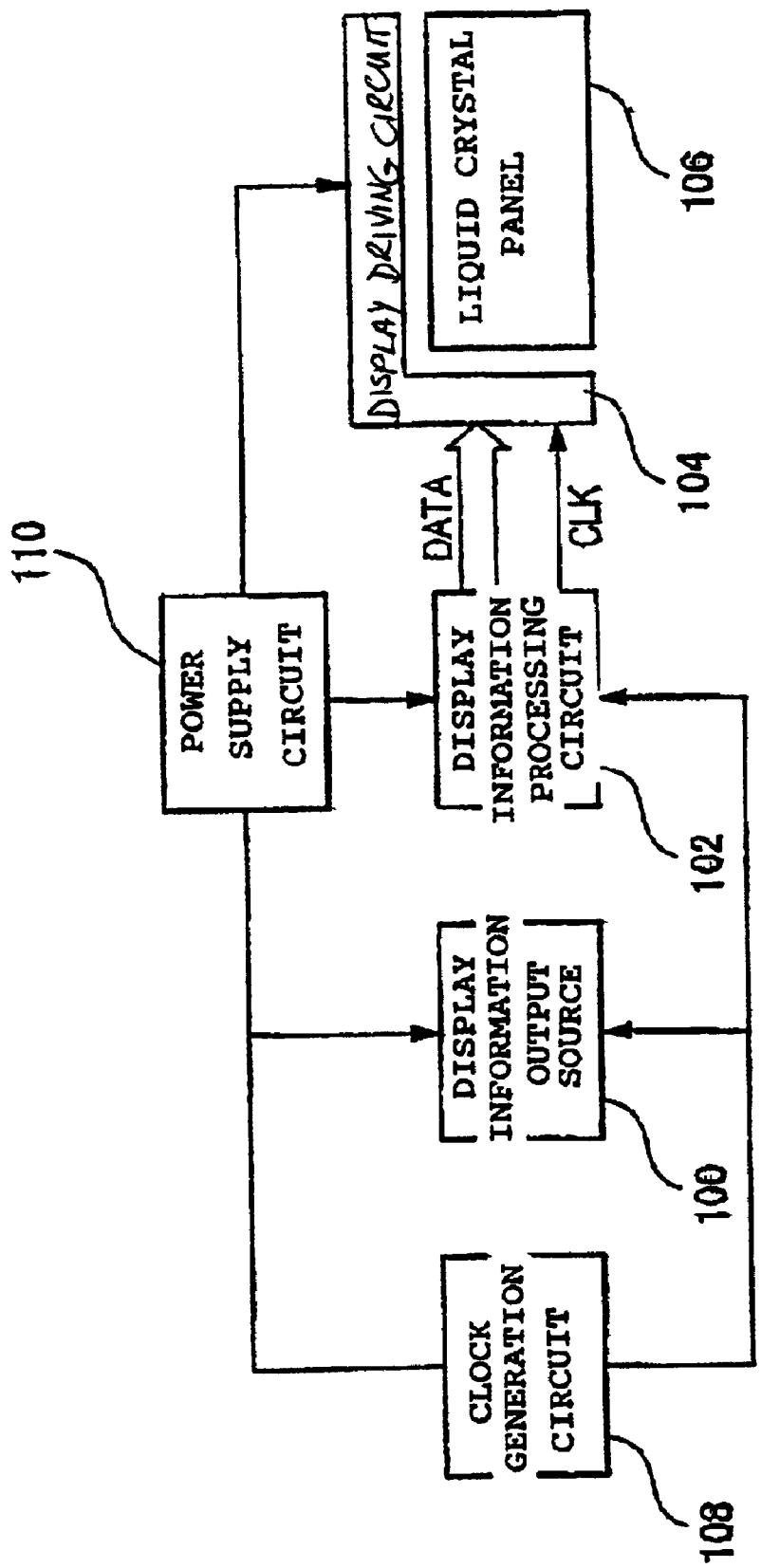
FIG. 32 is a block diagram of an electronic apparatus using a liquid crystal device of the various exemplary embodiments of the present invention.

As shown in a block diagram of FIG. 32, an electronic apparatus which includes the liquid crystal device of each of the above-described embodiments may include a display information output source 100, a display information processing circuit 102, a display driving circuit 104, a liquid crystal display panel 106, a clock generation circuit 108, and a power supply circuit 110. The display information output source 100 may include a memory such as a ROM, or a RAM, and a tuning circuit for tuning a television signal and outputting the signal so that display information is processed and output on the basis of the clock output from the clock generation circuit 108. The display information processing circuit 102 may include, for example, an amplification/polarity reverse circuit, a phase expansion circuit, a rotation circuit, a gamma correction circuit, a clamp circuit, for driving the liquid crystal display panel 106. The power supply circuit 110 supplies electric power to each of the circuits.

Figure 33:
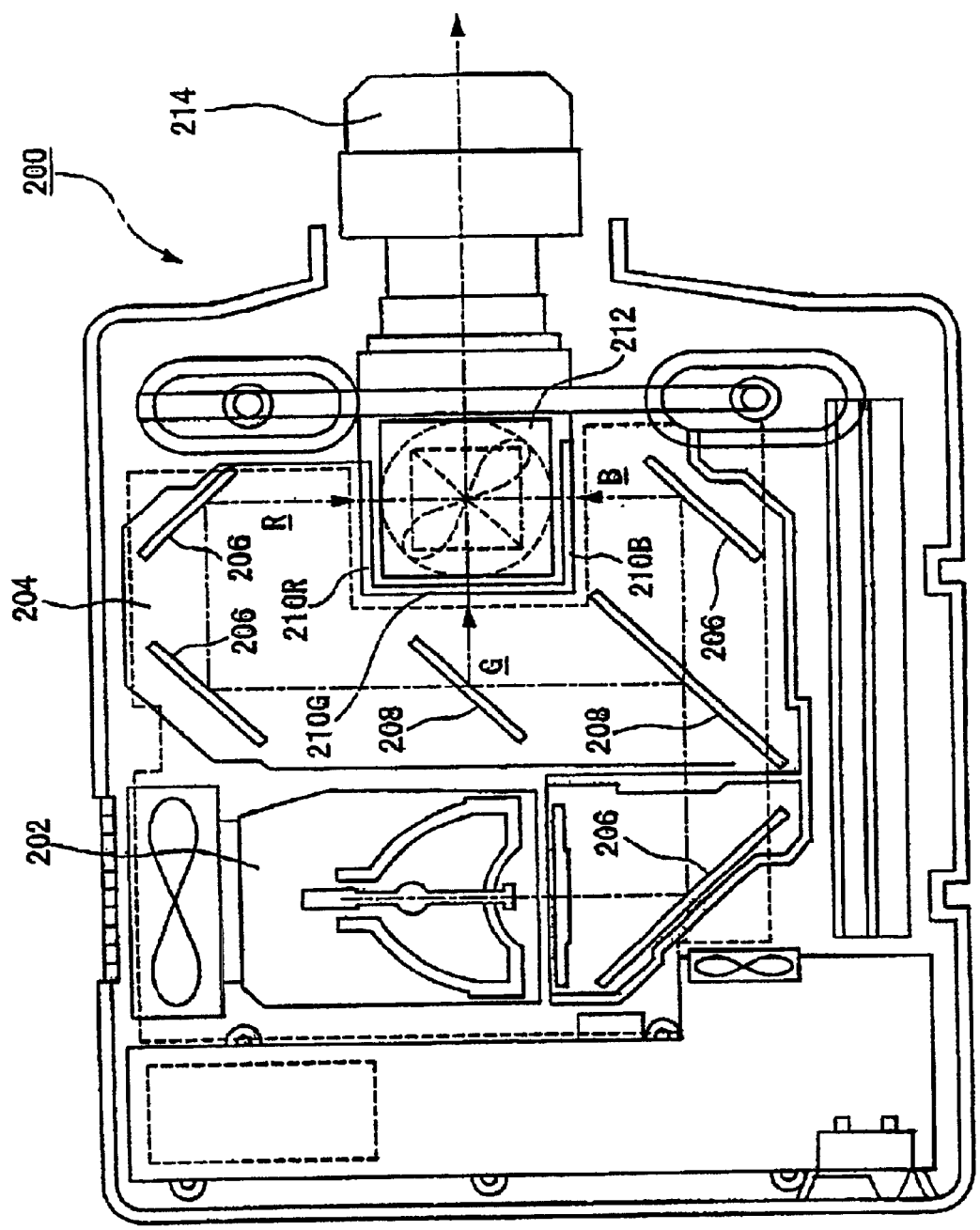
FIG. 33 is a schematic drawing of a projection liquid crystal display device using a liquid crystal device of the various exemplary embodiments of the present invention.
Figure 34:
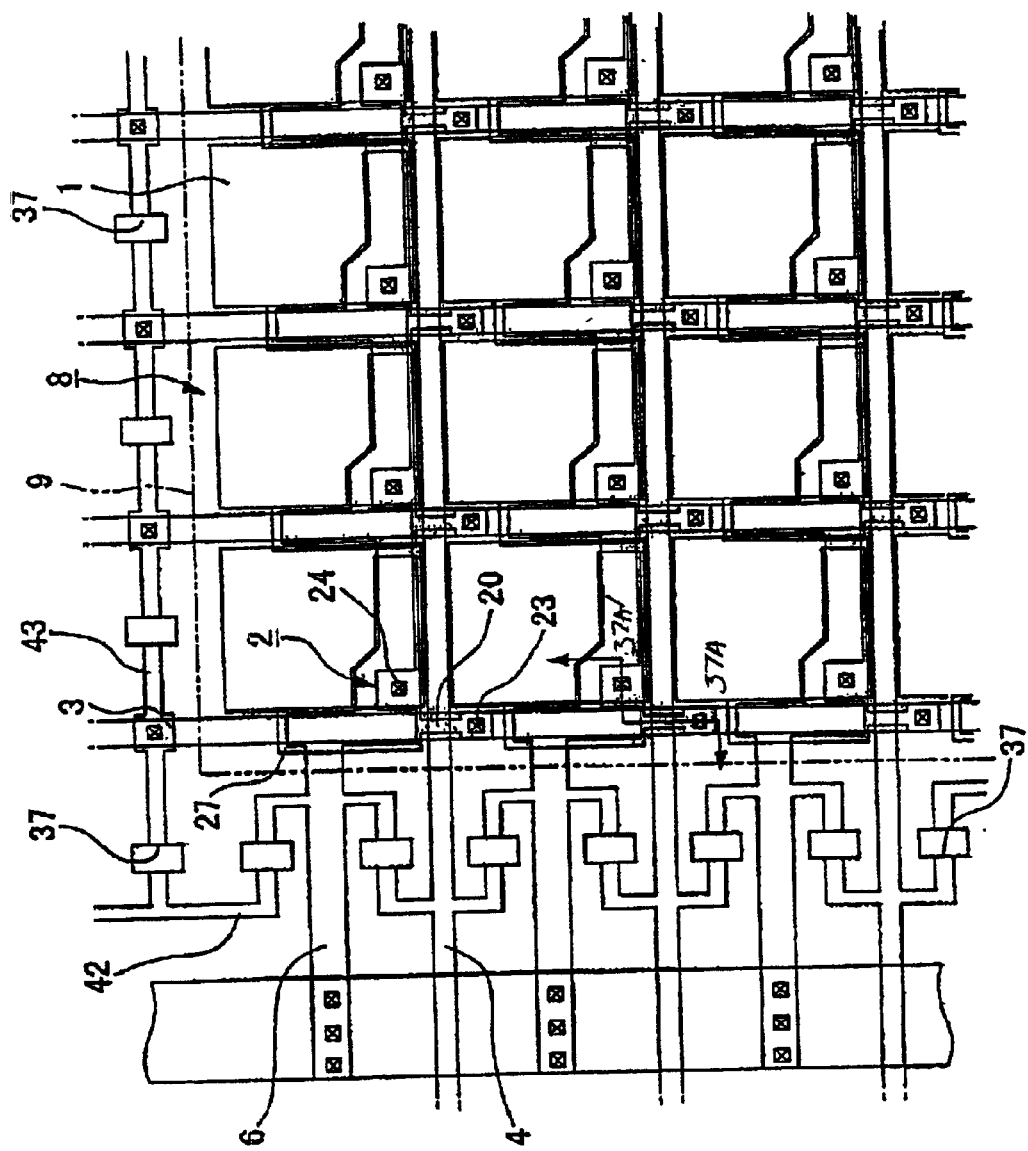
FIG. 34 is an enlarged plan view showing the corner of the pixel region of an active matrix substrate of a related liquid crystal device.
Figure 35:
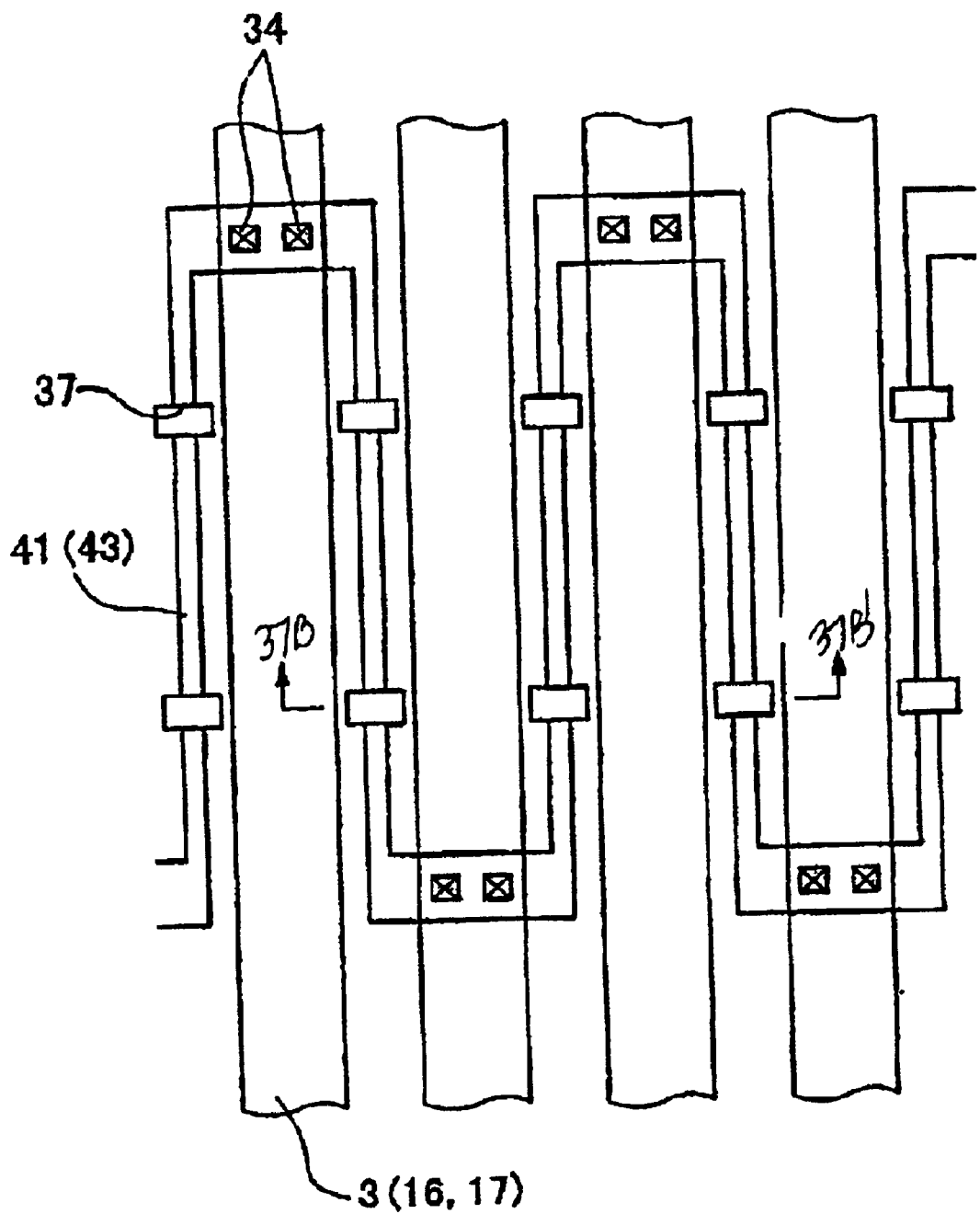
FIG. 35 is a plan view showing the connection structure between signal wiring and short-circuit wiring in the active matrix substrate of FIG. 34.
Figure 36:
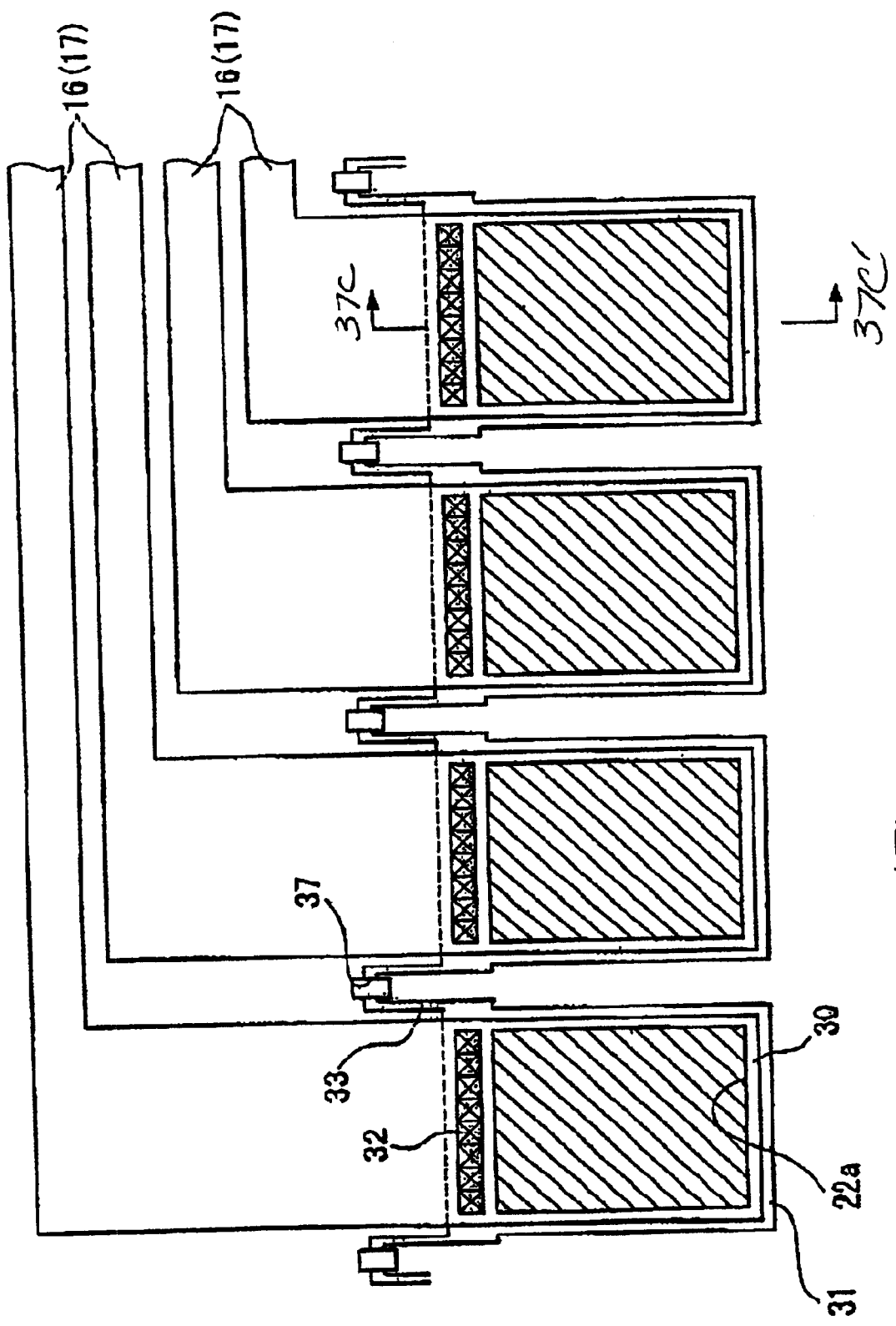
Figure 44A:
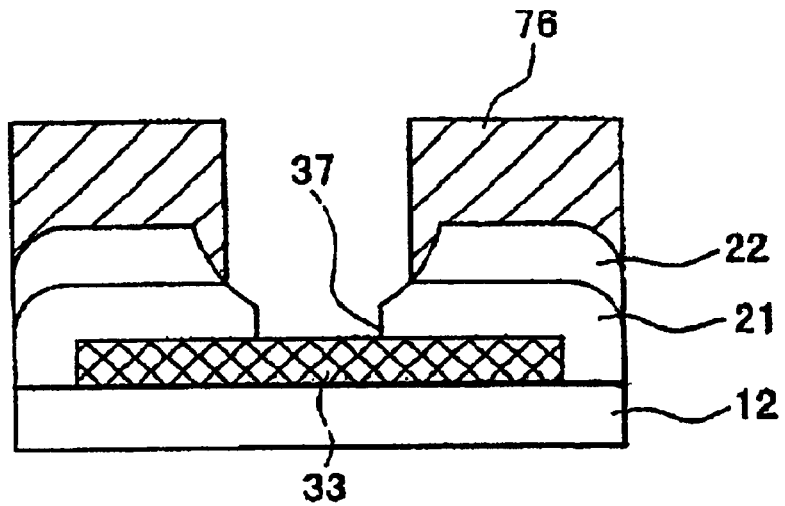
FIGS. 44(A)–(C) are drawings illustrating the steps of cutting short-circuit wiring among the steps shown in FIGS. 37(A)–(C) to FIGS. 43(A)–(C).
Figure 44B:
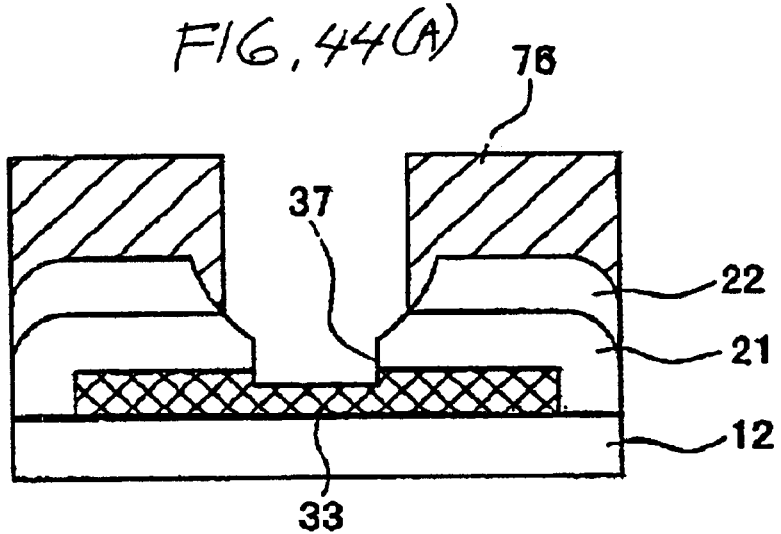
Figure 44C:
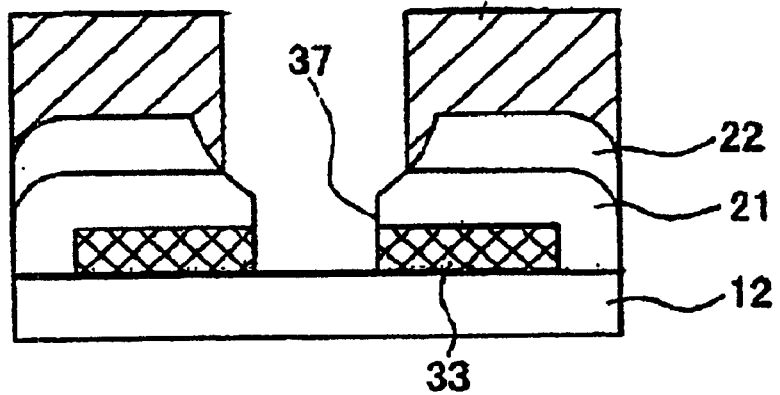

Examples of electronic apparatus having the above construction include the projection liquid crystal display (liquid crystal projector) shown in FIG. 33, a personal computer (PC) for multi-media, an engineering workstation (EWS), a pager, a portable telephone, a word processor, a television, a viewfinder-type or monitor direct-view-type videotape recorder, an electronic notebook, an electronic calculator, a car navigator, a POS terminal, or an apparatus that includes a touch panel. By using the liquid crystal device of each of the above-described embodiments, an electronic apparatus including a liquid display unit having less display defect due to electrostatic damage or the like, high image quality and high performance can be realized.

The projection liquid crystal display shown in FIG. 33 is a projection type projector using a liquid crystal display panel as a light valve, and may include, for example, three-prism optical system. In FIG. 33, in a projection liquid crystal display 200, incident light emitted from a lamp unit 202 of a white light source is separated (a light separation device) into three primary colors of R (red), G (green), and B (blue) by a plurality of mirrors 206 and two dichroic mirrors 208 in a light guide 204, and then guided to three liquid display panels 210R, 210G and 210B for displaying respective color images. The lights modulated by the liquid display panels 210R, 210G and 210B are incident on a dichroic prism 212 (a light synthesis device) from three directions. In the dichroic prism 212, lights of R and B are bent at 90°, and light of G goes straight to synthesize the color lights. Then, a color image is projected on a screen through a projection lens 214.

Particularly, the projection liquid crystal display has the tendency that it is easy for the user to see display defects because an image is enlarged and projected. However, by using the liquid display panel of the embodiments, a projected image having less surface defect due to electrostatic damage or the like, and high image quality can be obtained.

The technical field of the present invention is not limited to the above-described embodiments, and various changes can be made in the scope of the gist of the present invention. For example, the specified materials and thickness, etc. of various films, which constitute the active matrix substrate used in each of the embodiments as an example, can be appropriately changed. Also, the constituent materials of the etching stop layer and the short-circuit wiring may be appropriately changed according to the construction of a wiring layer. Although the manufacturing process of each of the embodiments is an example that may include the smallest number of steps, the etching stop layer can be formed, or the short-circuit wiring can be formed and cut by using any of various other methods as long as the manufacturing process is allowed to be complicated to some extent.

Although each of the embodiments uses a bonding SOG substrate as the raw material substrate in which the interface between a quartz substrate and a buried oxide film serves as a bonding interface, permeation of an etchant into the interface between the substrate and the buried oxide film is a problem in not only the bonding SOQ substrate but also other substrates according to the method of depositing the buried oxide film. For example, the construction of the present invention can also be applied to a substrate for a polycrystalline TFT liquid crystal display.

Furthermore, the range of application of the present invention includes the liquid crystal device substrate, and various electro-optical devices such as an electroluminescence device, a plasma display. The present invention can also be applied to a semiconductor device, for example, when a high-frequency semiconductor device is manufactured by using an SOI substrate.

Advantages

As described in detail above, in the present invention, an etching stop layer is interposed between short-circuit wiring and a base oxide film so that etching of an oxide film formed on the short-circuit wiring is stopped by the etching stop layer because the etching stop layer has resistance to etching of the oxide film, thereby preventing etching from proceeding to the bonding interface between the base oxide film and the substrate. Therefore, it is possible to securely prevent the occurrence of cracking or peeling of an insulating film accompanying the step of cutting the short-circuit wiring, protecting the substrate from static electricity and electric charge during the manufacturing process. Furthermore, such a measure against static electricity does not complicate the manufacturing process, thereby suppressing increases in the manufacturing cost and TAT.

What is claimed is:

1. A semiconductor device, comprising:

a substrate;

a base oxide film provided on the substrate;

a plurality of signal lines;

short-circuit wiring provided on the base oxide film that electrically connects the plurality of signal lines during a manufacturing process;

an insulating film covering the short-circuit wiring comprising a hole formed by etching that cuts the short-circuit wiring to release the signal lines from a short-circuit state; and an etching stop layer comprising a film having resistance to etching of an oxide film formed on a surface of the short-circuit wiring provided between the short-circuit wiring and the base oxide film in a region wider than at least the hole.

2. The semiconductor device according to claim 1, the etching stop layer comprising an arbitrary film located in a layer below the short-circuit wiring and used at positions other than formation positions of the short-circuit wiring in the semiconductor device.

3. An electro-optical device substrate constituting one of a pair of substrates of an electro-optical device having an electro-optical material held between the pair of substrates, the electro-optical device substrate comprising:

a substrate;

a base oxide film provided on the substrate;

a plurality of signal lines;

short-circuit wiring provided on the base oxide film that electrically connects the plurality of signal lines during a manufacturing process;

an insulating film covering the short-circuit wiring comprising a hole formed by etching that cuts the short-circuit wiring to release the signal lines from a short-circuit state; and an etching stop layer comprising a film having resistance to etching of an oxide film formed on a surface of the short-circuit wiring provided between the short-circuit wiring and the base oxide film in a region wider than at least the hole.

4. The electro-optical device substrate according to claim 3, the etching stop layer comprising an arbitrary film located in a layer below the short-circuit wiring and used at positions other than formation positions of the short-circuit wiring in the electro-optical device substrate.

5. A liquid crystal device substrate constituting one of a pair of substrates of a liquid crystal device having a liquid crystal held between the pair of substrates, the liquid crystal device substrate comprising:

a substrate;

a base oxide film provided on the substrate;

a plurality of signal lines;

short-circuit wiring provided on the base oxide film that electrically connects the plurality of signal lines during a manufacturing process;

an insulating film covering the short-circuit wiring comprising a hole formed by etching that cuts the short-circuit wiring to release the signal lines from a short-circuit state; and an etching stop layer comprising a film having resistance to etching of an oxide film formed on a surface of the short-circuit wiring provided between the short-circuit wiring and the base oxide film in a region wider than at least the hole.

6. The liquid crystal device substrate according to claim 5, the etching stop layer comprising an arbitrary film located in layer below the short-circuit wiring and used at positions other than formation positions of the short-circuit wiring in the liquid crystal device substrate.

7. The liquid crystal device substrate according to claim 6, further comprising thin film, transistors, each transistor comprising a silicon film as a semiconductor active film the etching stop layer comprising the silicon film in a same layer as the semiconductor active films, and the short-circuit wiring being made of a gate electrode material for the thin film transistors.

8. The liquid crystal device substrate according to claim 7, further comprising an insulating film constituting the silicon film of the thin film transistors and interposed between the short-circuit wiring and the etching stop layer.

9. The liquid crystal device substrate according to claim 7, the silicon film being a single crystal silicon film.

10. The liquid crystal device substrate according to claim 9, the substrate, the base oxide film and the single crystal silicon film being formed using, as a raw material substrate, a bonding SOI substrate having a bonding interface between the substrate and the base oxide film.

11. The liquid crystal device substrate according to claim 5, a portion of the signal lines comprising a wiring layer different from the short-circuit wiring, and the signal lines and the short-circuit wiring being electrically connected through contact holes passing through an insulating film interposed between the signal lines and the short-circuit wiring.

12. A liquid crystal device, comprising:

a pair of substrates; and a liquid crystal held between the pair of substrates, at least one of the pair of substrates comprising the liquid crystal device substrate according to claim 5.

13. A projection liquid crystal display, comprising:

the liquid crystal device according to claim 12 as a light valve, light emitted from a light source being modulated by the liquid crystal device; and a projection optical device, the modulated light being enlarged and projected on a projection screen by the projection optical device.

14. An electronic apparatus comprising the liquid crystal device according to claim 12.

15. A method of manufacturing a liquid crystal device substrate constituting one of a pair of substrates of a liquid crystal device having a liquid crystal held between the pair of substrates, the liquid crystal device substrate comprising a substrate, a base oxide film provided on the substrate, a plurality of signal lines, and short-circuit wiring provided on the base oxide film for electrically connecting the plurality of signal lines during a manufacturing process, the method comprising the steps of:

forming, on the base oxide film, an etching stop layer comprising a film having resistance to etching of an oxide film formed on the short-circuit wiring;

forming the short-circuit wiring on the base oxide film so that the short-circuit wiring crosses the etching stop layer;

forming an insulating film to cover the short-circuit wiring;

forming holes by etching in the insulating film above a formation region of the etching stop layer, for cutting the short-circuit wiring to release the signal lines from a short-circuit state;

etching out the oxide film formed on the short-circuit wiring through the holes; and cutting the short-circuit wiring through the holes.

16. The method of manufacturing a liquid crystal device substrate according to claim 15, the etching stop layer being formed before formation of the short-circuit wiring, and comprising an arbitrary film used at positions other than formation positions of the short-circuit wiring in the liquid crystal device substrate.

17. A method of manufacturing a liquid crystal device substrate constituting one of a pair of substrates of a liquid crystal device having a liquid crystal held between the pair of substrates, the liquid crystal device substrate comprising a substrate, a base oxide film provided on the substrate, a plurality of signal lines, a plurality of pixel electrodes respectively connected to the plurality of signal lines, short-circuit wiring provided on the base oxide film for electrically connecting the plurality of signal lines during a manufacturing process, and thin film transistors each comprising a silicon film as a semiconductor active film; the method comprising the steps of:

patterning a silicon film on the base oxide film to form the semiconductor active films of the thin film transistors and to form an etching stop layer having resistance to etching of a silicon oxide film;

forming a silicon oxide film on the silicon film remaining;

depositing a gate electrode material film for the thin film transistors over an entire surface and patterning it to form scanning lines which constitute the signal lines, gate electrodes of the thin film transistors, and the short-circuit wiring which crosses the etching stop layer;

introducing an impurity into the semiconductor active films of the thin film transistors to form source regions and drain regions;

forming a first interlayer insulating film to cover the thin film transistors and the short-circuit wiring;

patterning the first interlayer insulating film to form source contact holes which pass through the first interlayer insulating film and reach the source regions of the thin film transistors;

depositing a conductive film and patterning it to form data lines which constitute the signal lines electrically connected to the source regions through the source contact holes, and form terminals;

forming a second interlayer insulating film to cover the data lines and the terminals;

patterning the second interlayer insulating film and the first interlayer insulating film to form drain contact holes which pass through both of the first interlayer insulating film and the second interlayer insulating film and reach the drain regions of the thin film transistors, and form holes in formation regions of the etching stop layer, for cutting the short-circuit wiring;

forming pixel electrodes electrically connected to the drain regions through the drain contact holes;

forming a mask pattern having holes on the second interlayer insulating film and wet-etching the second interlayer insulating film to expose surfaces of the terminals and removing a native oxide film formed on the short-circuit wiring through the holes; and cutting the short-circuit wiring by etching through the holes.

18. The method of manufacturing a liquid crystal device substrate according to claim 17, each of the semiconductor active film of each of the thin film transistors and the silicon film, which constitutes the etching stop layer, comprising a single crystal silicon film, and a bonding SOI substrate is used as a raw material substrate.

* * * * *